United States Patent
Cili et al.

(10) Patent No.: US 9,380,557 B2
(45) Date of Patent: Jun. 28, 2016

(54) ADAPTIVE OUT OF SERVICE SCANNING

(71) Applicant: Apple Inc., Cupertino, CA (US)

(72) Inventors: Gencer Cili, Santa Clara, CA (US);
Devrim Varoglu, Santa Clara, CA (US);
Qi He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/919,598

(22) Filed: Jun. 17, 2013

(65) Prior Publication Data

US 2013/0344902 A1    Dec. 26, 2013

Related U.S. Application Data

(60) Provisional application No. 61/662,299, filed on Jun. 20, 2012, provisional application No. 61/662,328, filed on Jun. 20, 2012.

(51) Int. Cl.
| | |
|---|---|
| *H04W 4/00* | (2009.01) |
| *H04W 64/00* | (2009.01) |
| *H04W 52/02* | (2009.01) |
| *H04W 48/16* | (2009.01) |
| *H04W 48/08* | (2009.01) |

(52) U.S. Cl.
CPC ............ *H04W 64/006* (2013.01); *H04W 48/16* (2013.01); *H04W 52/0245* (2013.01); *H04W 48/08* (2013.01)

(58) Field of Classification Search
CPC ..... H04W 48/04; H04W 48/16; H04W 48/17; H04W 48/18; H04W 48/06; H04W 48/08; H04W 52/0245; H04W 64/006

USPC ............ 455/154.1, 154.2, 160.1, 161.1, 421, 455/434

See application file for complete search history.

(56) References Cited

U.S. PATENT DOCUMENTS

| | | | |
|---|---|---|---|
| 6,807,163 | B1 | 10/2004 | Shi |
| 8,090,395 | B2 | 1/2012 | Ngai et al. |
| 8,165,583 | B2 | 4/2012 | Parron et al. |
| 8,195,122 | B1 * | 6/2012 | Kahn et al. .................. 455/404.2 |
| 8,331,929 | B2 | 12/2012 | Brisebois et al. |
| 8,406,757 | B1 | 3/2013 | Singh et al. |
| 2009/0103503 | A1 * | 4/2009 | Chhabra ....................... 370/338 |
| 2010/0009643 | A1 * | 1/2010 | Haartsen ..................... 455/127.5 |
| 2013/0122902 | A1 * | 5/2013 | Ren ................................ 455/434 |

* cited by examiner

*Primary Examiner* — Rei-Tsang Shiao
*Assistant Examiner* — Thai Vu
(74) *Attorney, Agent, or Firm* — Downey Brand LLP

(57) ABSTRACT

A method for selecting an out of service (OOS) scan mode for a wireless communication device is provided. The method can include the wireless communication device detecting occurrence of an OOS condition; setting a displacement threshold in response to the OOS condition; determining a displacement magnitude indicative of a distance traveled by the wireless communication device during the OOS condition; determining whether the displacement magnitude exceeds the displacement threshold; using a first scan mode to scan for network coverage in an instance in which it is determined that the displacement magnitude exceeds the displacement threshold; and using a second scan mode to scan for network coverage in an instance in which it is determined that the displacement magnitude does not exceed the displacement threshold. The first scan mode can have a greater scan frequency than the second scan mode.

20 Claims, 13 Drawing Sheets

ADAPTIVE OUT OF SERVICE SCANNING

CROSS-REFERENCE TO RELATED APPLICATIONS

This application claims priority to both U.S. Provisional Patent Application No. 61/662,299, filed on Jun. 20, 2012, and U.S. Provisional Patent Application No. 61/662,328, filed on Jun. 20, 2012, the contents of both of which are incorporated herein in their entirety by reference.

FIELD OF THE DESCRIBED EMBODIMENTS

The described embodiments relate generally to wireless communications and more particularly to adaptive out of service (OOS) scanning.

BACKGROUND

During the course of wireless communication device usage, the wireless communication device can loose connectivity to a cellular network, resulting in an out of service (OOS) condition. Loss of connectivity can be due to a variety of reasons. In some cases, loss of connectivity can result from the wireless communication device moving to an area with limited or no coverage. As another example, loss of connectivity can result from the wireless communication device experiencing a temporary loss of reception due to a fading condition, such as can result from a shadowing effect in an urban location, such as when a wireless communication device is located in an elevator.

When a wireless communication device experiences an OOS condition as a result of losing network connectivity, the wireless communication device typically scans for network service to reacquire network connectivity. In many cases, the wireless communication device can repeatedly scan unsuccessfully for networks and cause battery depletion, especially when the wireless communication device is in an area where there is no coverage. Some wireless communication devices attempt to reduce battery depletion resulting from unsuccessful scan attempts by applying a back-off algorithm in which the intervals between scan attempts are gradually increased over time. However, application of a back-off algorithm to reduce battery depletion can have a negative tradeoff, as when the wireless communication device moves into a location where network coverage exists, there can be an undesirable delay in re-establishing network connection due to the increased interval between scan attempts.

SUMMARY OF THE DESCRIBED EMBODIMENTS

Some example embodiments disclosed herein provide for adaptive OOS scanning whereby a wireless communication device can be configured to select an aggressiveness of a scanning mode to apply when scanning for network coverage in an OOS condition based at least in part on the likelihood that the device will discover network coverage. In this regard, a wireless communication device in accordance with some example embodiments can apply an aggressive scan mode with a greater frequency of scan attempts (e.g., smaller intervals between scan attempts) in a situation in which the device is more likely to reacquire network service and can apply a non-aggressive scan mode having a lower frequency of scan attempts (e.g., larger intervals between scan attempts) in a situation in which the device is less likely to reacquire network service.

More particularly, the wireless communication device of some example embodiments can be configured to set a displacement threshold defining a threshold a displacement threshold defining a threshold minimum distance to be traveled by the device during the OOS before an aggressive scan mode with a higher scanning frequency is applied based on conditions observed by the wireless communication device that can be indicative of how far the wireless communication device may have to travel before reentering an area of network coverage such that it is likely that network coverage can be reacquired. If the device has not traveled at least the threshold distance during the OOS condition, then a non-aggressive scan mode with a lower scanning frequency can be used. After the device of such example embodiments has traveled the threshold distance during the OOS condition, the device can switch to a more aggressive scan mode with an increased frequency of scan attempts.

This Summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

When a wireless communication device experiences an OOS condition, there is always a tradeoff between quickly reacquiring network service and reducing the level of battery consumption. In this regard, while performing more frequent scans can result in the device reacquiring network service more quickly, increasing the scanning frequency results in increased battery consumption. In contrast, while reducing the scanning frequency reduces the level of battery consumption, reduced scanning frequency can result in slower reacquisition of network service by the device. The balance between reacquiring network service as quickly as possible while avoiding unnecessary scans that result in excess battery consumption is very crucial for device performance.

Figure 1:
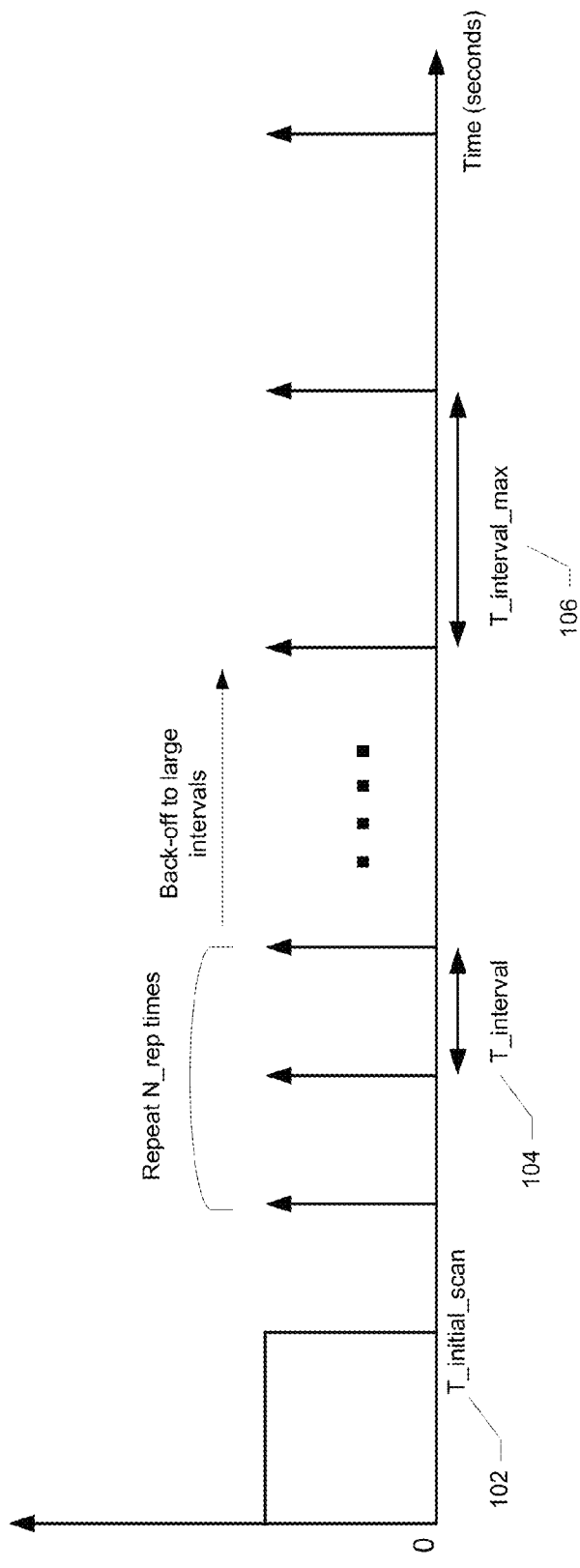
FIG. 1 illustrates an example generic non-adaptive cellular search pattern.

Current search algorithms applied during OOS conditions utilize a generic non-adaptive search pattern, such as that illustrated in FIG. 1. The generic non-adaptive search pattern includes performance of an initial continuous scan period for a continuous scan period spanning from detection of the OOS condition to time T_initial_scan 102, as illustrated in FIG. 1. After the initial continuous scan period, the device applies a back-off algorithm and performs scans at predefined time intervals, such as T_interval 104. After each scan attempt (or after repeatedly scanning with a certain interval, such as T_interval 104, N_rep times), the scan interval is increased until converging to a maximum scan interval, such as T_interval_max 106, which is used by the device until it finds cellular network coverage. Thus, in the example of FIG. 1, the initial T_interval 104 that is used after the initial continuous scan period is completed at T_initial_scan 102 is progressively increased by way of a backoff mechanism with each scan attempt performed after N_rep scans until converging to T_interval_max 106.

Figure 2:
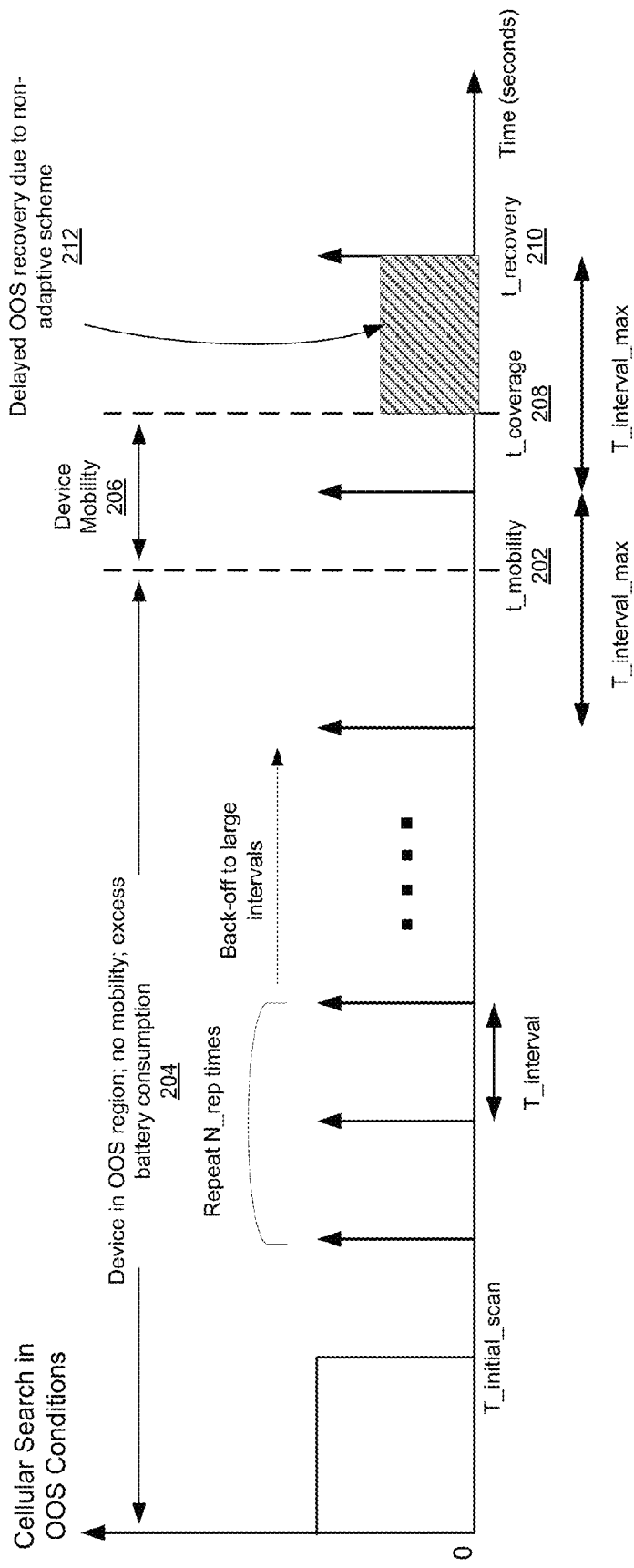
FIG. 2 illustrates example problems that can result from use of the generic non-adaptive cellular search pattern of FIG. 1 in out of service conditions.

The generic non-adaptive cellular search pattern illustrated in FIG. 1 does not take into consideration the user and device specific conditions, as illustrated in FIG. 2, and can present several problems when used to perform a search in an OOS condition. In this regard, the device can be in a coverage hole during the OOS condition. Thus, if the device does not move for a period during the OOS condition, any scan attempts can be unsuccessful and can result in excess battery condition. In the example of FIG. 2, the device remains substantially in the same location from the beginning of the OOS condition until time t_mobility 202. Thus, as illustrated by the period 204, the frequent scan attempts performed prior to t_mobility 202 in accordance with the generic non-adaptive search pattern can be unsuccessful and result in excess battery consumption by the device, as the device remains in an OOS region while substantially stationary.

After a period of device mobility 206, the device reenters an area with network coverage at time t_coverage 208. However, as a result of the increased intervals between scan attempts pursuant to the back-off mechanism of the generic non-adaptive search pattern applied during the period 204 when the device was not mobile, the device does not perform a scheduled scan after reentering network coverage until time t_recovery 210. Thus, even after the device reenters network coverage, OOS recovery can be delayed for the delay period 212 between t_coverage 208 and t_recovery 210, which can have a duration of anywhere between [0-T_interval_max] depending on when t_coverage 208 occurs relative to the previous scan attempt. User experience can accordingly suffer due to delayed scanning for network coverage after reentering an area of coverage when using a generic non-adaptive search pattern, as illustrated by the delay period 212 in the example of FIG. 2.

Some example embodiments provide systems, methods, apparatuses, and computer program products for performing adaptive OOS scanning, which address deficiencies resulting from usage of conventional generic non-adaptive search patterns, such as illustrated in and described with respect to FIG. 1 and FIG. 2. For example, adaptive OOS scanning in accordance with some example embodiments can reduce the incidence of excess battery consumption and delayed OOS recovery that result from usage of conventional generic non-adaptive search patterns.

In this regard, rather than using the same predefined time interval(s) for scanning during OOS conditions, a wireless communication device in accordance with some example embodiments can be configured to adaptively select a scan mode to apply based at least in part on a likelihood that network service can be reacquired and/or based on user triggered events indicative of whether a user desires network service during the OOS condition. More particularly, in accordance with some example embodiments, a more aggressive scan mode (e.g., a higher scan frequency and/or smaller interval(s) between scan attempts) can be applied in scenarios in which the device is more likely to reacquire network service and/or in which the user demands service so as to avoid delayed OOS recovery and improve user experience in such scenarios. Similarly, in scenarios in which the device is less likely to reacquire service and/or when the user does not demand service, a less aggressive, or passive, scan mode (e.g., lower scan frequency and/or larger interval(s) between scan attempts) can be applied so as to avoid unnecessary battery consumption that would otherwise result from unnecessary/failed scan attempts in such scenarios.

As will be described further herein below, a variety of factors can be utilized by a wireless communication device in accordance with various example embodiments to select the scan mode to use in an OOS condition. For example, the likelihood of reacquiring network service can be evaluated based at least in part on device location; device mobility conditions, such as device position, velocity, distance traveled after occurrence of the OOS condition, and/or other mobility factors; date/time of the OOS condition; pre-known harvested location data for cellular coverage with a certain proximity to the region of OOS condition (e.g., location-coverage mapping information); and/or the like. User triggered events that can be used to determine whether the device user desires network service during the OOS condition can, for example, include touch screen events; an input to a keypad; user attempt to make a call; attempt to make an emergency call; a pending text message, such as a short message service (SMS) message, multimedia messaging service (MMS) message, and/or other text message; and/or other user input that can be indicative of a user desire for and/or user action requiring network service. As will be appreciated from further discussion of various embodiments herein below, the user events and device condition metrics which can be utilized in adaptive scan mode are configurable and the decision on a scan mode to apply can be based on a combination of various events/metrics.

Figure 3:
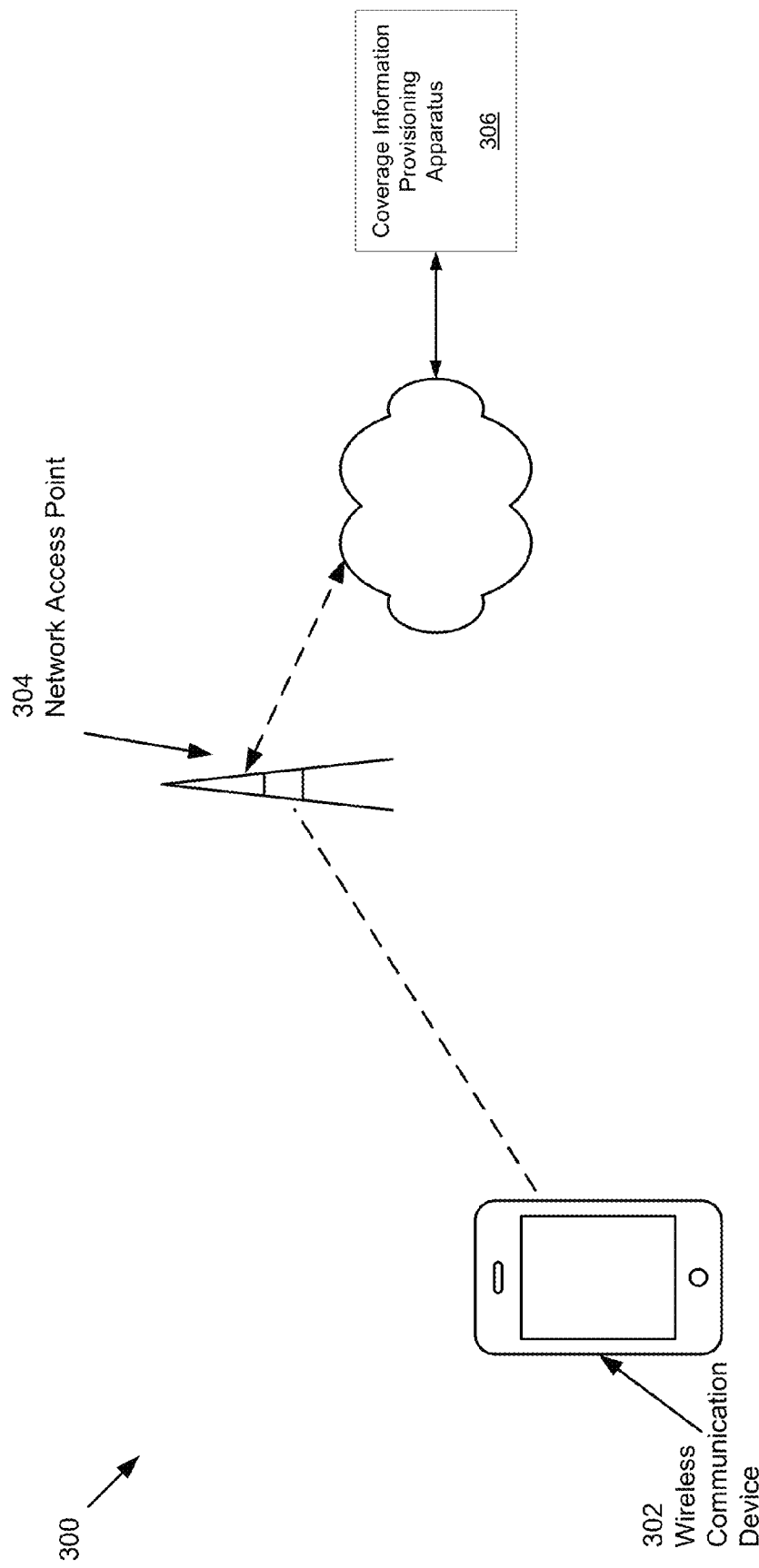
FIG. 3 illustrates an example wireless communication system in accordance with some example embodiments.

FIG. 3 illustrates an example wireless communication system 300 in accordance with some example embodiments. The system 300 can include a wireless communication device 302, which, by way of non-limiting example, can be embodied as a cellular phone, such as a smart phone device, a tablet computing device, a laptop computing device, or other computing device configured to access a cellular and/or other wireless networks.

The system 300 can further include one or more network access points 304. A network access point 304 can be embodied as any access point that can be used to access a wireless network. Thus, for example, in embodiments in which the system 300 includes one or more cellular networks, which the wireless communication device 302 can be configured to access, a network access point 304 can be a cellular base station, such as a base transceiver station, node B, evolved node B (eNB), home eNB, and/or other cellular base station. In embodiments in which the system 300 includes a network access point(s) 304 that is embodied as cellular base station, the network access point(s) 304 can be configured to provide access to a cellular network(s) using any cellular radio access technology (RAT). Thus, by way of non-limiting example, the system 300 can include a network access point 304 configured to provide access to a cellular network using a fourth generation (4G) cellular RAT, such as Long Term Evolution (LTE), LTE-Advanced (LTE-A), and/or the like; a third generation (3G) cellular RAT, such as Wideband Code Division Multiple Access (WCDMA) or other Universal Mobile Telecommunications System (UMTS) RAT, a CDMA2000 RAT, and/or the like; a second generation cellular (2G) RAT, such as Global System for Mobile Communications (GSM); and/or other present or future developed cellular RAT.

It will be appreciated, however, that embodiments disclosed herein are not limited to application within cellular networks, but can also be applied to OOS scanning for wireless networks using radio access technologies (RATs) other than cellular RATs. For example, some embodiments can be applied to OOS scanning for wireless local area networks (WLANs), such as, by way of example, WLANs implementing an Instituted of Electrical and Electronics Engineers (IEEE) 802.11 standard. As such, it will be appreciated that a network access point 304 can be a type of wireless network access point other than a cellular base station, such as a wireless router for a WLAN, in embodiments in which the system 300 includes a non-cellular wireless network(s) for which OOS scanning can be performed in addition to or in lieu of a cellular network(s). It will be further appreciated that where example embodiments are described with respect to OOS scanning for cellular networks, techniques and methodologies described with respect to those embodiments can be applied mutatis mutandis to OOS scanning for other wireless networking technologies within the scope of the disclosure.

The wireless communication device 302 can be configured to access a wireless network via a network access point 304. When the wireless communication device 302 is in a mobility state, the wireless communication device 302 can transition between network access points. The wireless communication device 302 can encounter an OOS condition in an instance in which the device loses and/or otherwise cannot establish a connection to a network access point 304. For example, the wireless communication device 302 can experience an OOS condition in an instance in which, due to mobility, the wireless communication device 302 enters an area known as a coverage gap, which is not within sufficient range of a network access point 304 to receive network coverage. As a further example, the wireless communication device 302 can experience an OOS condition in an instance in which the wireless communication device 302 is within signaling range of a network access point 304, but at least temporarily loses signal from the network access point 304 due to a shadowing condition that can be caused by an obstruction in the signal path, such as can occur if the wireless communication device 302 is in an elevator.

When the wireless communication device 302 experiences an OOS condition, the wireless communication device 302 can be configured to scan for network coverage. In some instances OOS scanning for network coverage can, for example, include scanning for the same network/RAT that the wireless communication device 302 was using before experiencing the OOS condition. Additionally or alternatively, in some instances, OOS scanning can include scanning for an alternative network(s)/RAT(s) in addition to or in lieu of the network/RAT that the wireless communication device 302 was using before experiencing the OOS condition. As will be described further herein below, the wireless communication device 302 can be configured to perform adaptive scanning in an OOS condition based at least in part on conditions observed by the device, such as a likelihood that the device can reacquire network service, user input to the device indicative of whether the user wants to utilize a service or function needing network service, and/or other conditions.

In some example embodiments, the system 300 can optionally further include a coverage information provisioning apparatus 306. In embodiments including a coverage information provisioning apparatus 306, the coverage information provisioning apparatus 306 can, for example, be a network-accessible entity that can be operated by a network carrier, a manufacturer of the wireless communication device 302, and/or other service provider. The coverage information provisioning apparatus 306 can, for example, be embodied as a one or more servers, a cloud computing infrastructure, or other computing entity. As will be described further herein below, the coverage information provisioning apparatus 306 can be a network entity that in some example embodiments can collect data regarding network coverage in various locations and can form and store location-coverage mapping information indicative of whether network coverage is available in respective locations. In embodiments including a coverage information provisioning apparatus 306, location-coverage mapping information that can be maintained by the coverage information provisioning apparatus 306 can be provisioned to the wireless communication device 302 and can be used by the wireless communication device 302 to evaluate a likelihood of reacquiring network service during an OOS condition and to select an appropriate scan mode given the device's location, as will be further described herein below.

Figure 4:
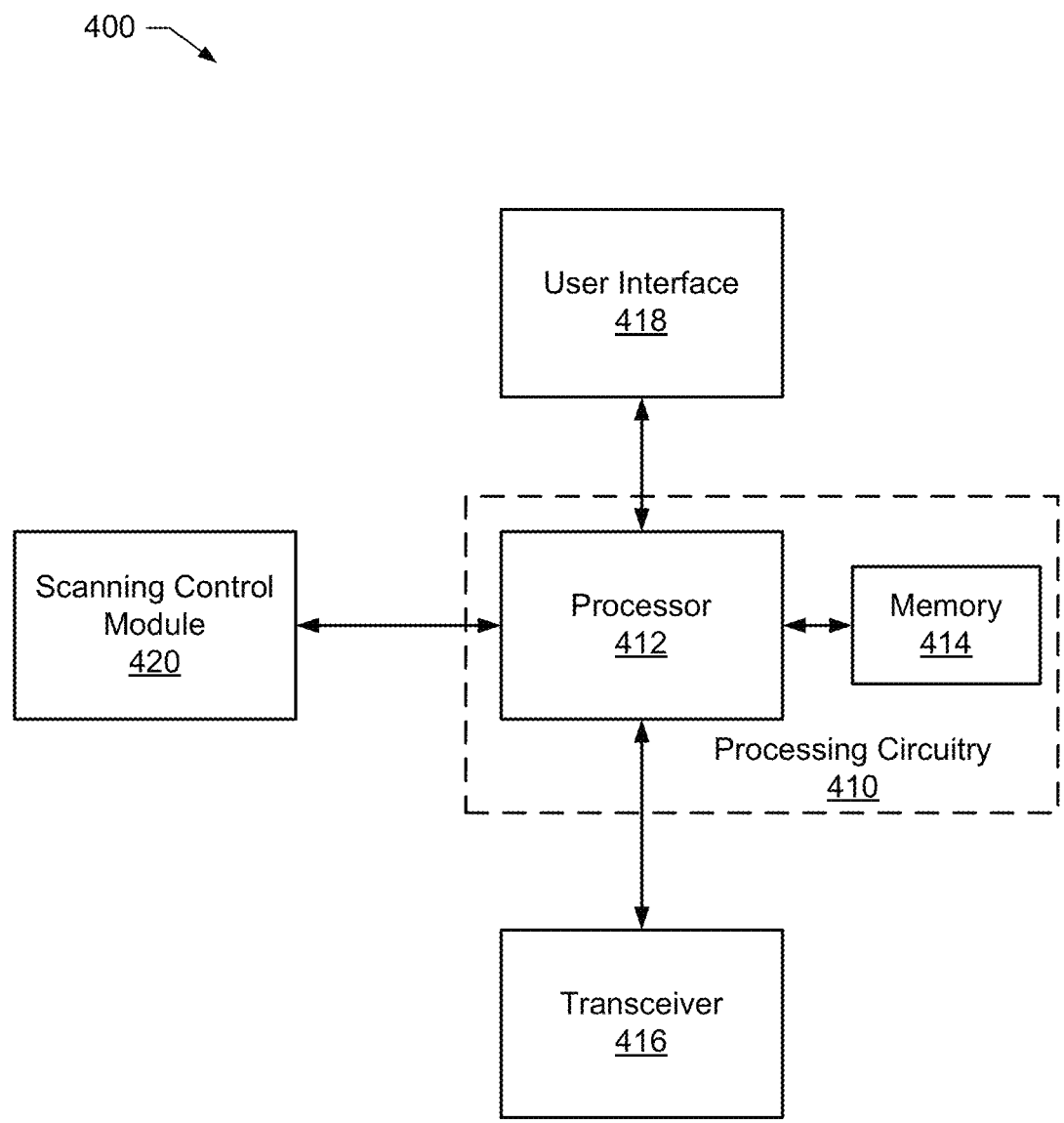
FIG. 4 illustrates a block diagram of an apparatus that can be implemented on a wireless communication device in accordance with some example embodiments.

FIG. 4 illustrates a block diagram of an apparatus 400 that can be implemented on a wireless communication device 302 in accordance with some example embodiments. In this regard, when implemented on a computing device, such as wireless communication device 302, apparatus 400 can enable the computing device to operate within the system 300 in accordance with one or more example embodiments. It will be appreciated that the components, devices or elements illustrated in and described with respect to FIG. 4 below may not be mandatory and thus some may be omitted in certain embodiments. Additionally, some embodiments can include further or different components, devices or elements beyond those illustrated in and described with respect to FIG. 4.

In some example embodiments, the apparatus 400 can include processing circuitry 410 that is configurable to perform actions in accordance with one or more example embodiments disclosed herein. In this regard, the processing circuitry 410 can be configured to perform and/or control performance of one or more functionalities of the apparatus 400 in accordance with various example embodiments, and thus can provide means for performing functionalities of the apparatus 400 in accordance with various example embodiments. The processing circuitry 410 can be configured to perform data processing, application execution and/or other processing and management services according to one or more example embodiments.

In some embodiments, the apparatus 400 or a portion(s) or component(s) thereof, such as the processing circuitry 410, can include one or more chipsets, which can each include one or more chips. The processing circuitry 410 and/or one or more further components of the apparatus 400 can therefore, in some instances, be configured to implement an embodiment on a single chip or chipset. In some example embodiments in which one or more components of the apparatus 400 are embodied as a chipset, the chipset can be capable of enabling a computing device to operate in the system 300 when implemented on or otherwise operably coupled to the computing device. Thus, for example, one or more components of the apparatus 400 can provide a chipset configured to enable a computing device to operate over a wireless network. In some such example embodiments, one or more components of the apparatus 400 can be embodied on a cellular chipset.

In some example embodiments, the processing circuitry 410 can include a processor 412 and, in some embodiments, such as that illustrated in FIG. 4, can further include memory 414. The processing circuitry 410 can be in communication with or otherwise control a transceiver 416, user interface 418, and/or scanning control module 420.

The processor 412 can be embodied in a variety of forms. For example, the processor 412 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 412 can comprise a plurality of processors. The plurality of processors can be in operative communication with each other and can be collectively configured to perform one or more functionalities of the apparatus 400 as described herein. In some example embodiments, the processor 412 can be configured to execute instructions that can be stored in the memory 414 or that can be otherwise accessible to the processor 412. As such, whether configured by hardware or by a combination of hardware and software, the processor 412 capable of performing operations according to various embodiments while configured accordingly.

In some example embodiments, the memory 414 can include one or more memory devices. Memory 414 can include fixed and/or removable memory devices. In some embodiments, the memory 414 can provide a non-transitory computer-readable storage medium that can store computer program instructions that can be executed by the processor 412. In this regard, the memory 414 can be configured to store information, data, applications, instructions and/or the like for enabling the apparatus 400 to carry out various functions in accordance with one or more example embodiments. In some embodiments, the memory 414 can be in communication with one or more of the processor 412, transceiver 416, user interface 418, or scanning control module 420 via one or more buses for passing information among components of the apparatus 400.

The apparatus 400 can further include one or more transceivers, collectively illustrated and referenced as transceiver 416. The transceiver 416 can enable the apparatus 400 to send wireless signals to and receive signals from one or more wireless networks. In this regard, the transceiver 416 can be configured to support sending wireless signals to and receiving wireless signals from a network access point 304. As such, the transceiver 416 can be configured to support communication via any type of cellular or other wireless communication technology that can be supported by the wireless communication device 302 and/or network access point 304.

In some example embodiments, the apparatus 400 can include the user interface 418. It will be appreciated, however, that in some example embodiments, one or more aspects of the user interface 418 can be omitted, and in some embodiments, the user interface 418 can be omitted entirely. The user interface 418 can be in communication with the processing circuitry 410 to receive an indication of a user input and/or to provide an audible, visual, mechanical, or other output to a user. As such, the user interface 418 can include, for example, a keyboard, a mouse, a joystick, a display, a touch screen display, a microphone, a speaker, one or more biometric input devices, and/or other input/output mechanisms. In embodiments wherein the user interface 418 comprises a touch screen display, the user interface 418 can additionally be configured to detect and/or receive an indication of a touch gesture or other input to the touch screen display.

The apparatus 400 can further include scanning control module 420. The scanning control module 420 can be embodied as various means, such as circuitry, hardware, a computer program product comprising a computer readable medium (for example, the memory 414) storing computer readable program instructions executable by a processing device (for example, the processor 412), or some combination thereof. In some embodiments, the processor 412 (or the processing circuitry 410) can include, or otherwise control the scanning control module 420. As described further herein below, the scanning control module 420 can be configured to control the performance of adaptive OOS scanning in accordance with various example embodiments.

The scanning control module 420 of some example embodiments can be configured to implement a statistical mode for adaptively selecting a scan mode to use in the event of an OOS condition. More particularly, the scanning control module 420 of some example embodiments can be configured to leverage the statistical behavior for a received signal quality measurement quality from a serving network access point (e.g., a serving network access point 104) before the OOS condition. In this regard, the scanning control module 420 can be configured to estimate the cause of the OOS condition based at least in part on one or more received signal quality measurements before the wireless communication device 302 experienced the OOS condition and completed the initial scan without reacquiring network service. The signal quality measurement(s) that can be used by the scanning control module 420 to make this estimation can be any appropriate measurement of a received signal power and/or other signal quality indication in accordance with a RAT used by the network to which the wireless communication device 302 was connected prior to the OOS condition. By way of non-limiting example, the scanning control module 420 can use a reference signal received power (RSRP) measurement, reference signal received quality (RSRQ) measurement, received signal code power (RSCP) measurement, received signal strength indicator (RSSI) measurement, some combination thereof, and/or the like to measure the received signal quality.

Figure 5:
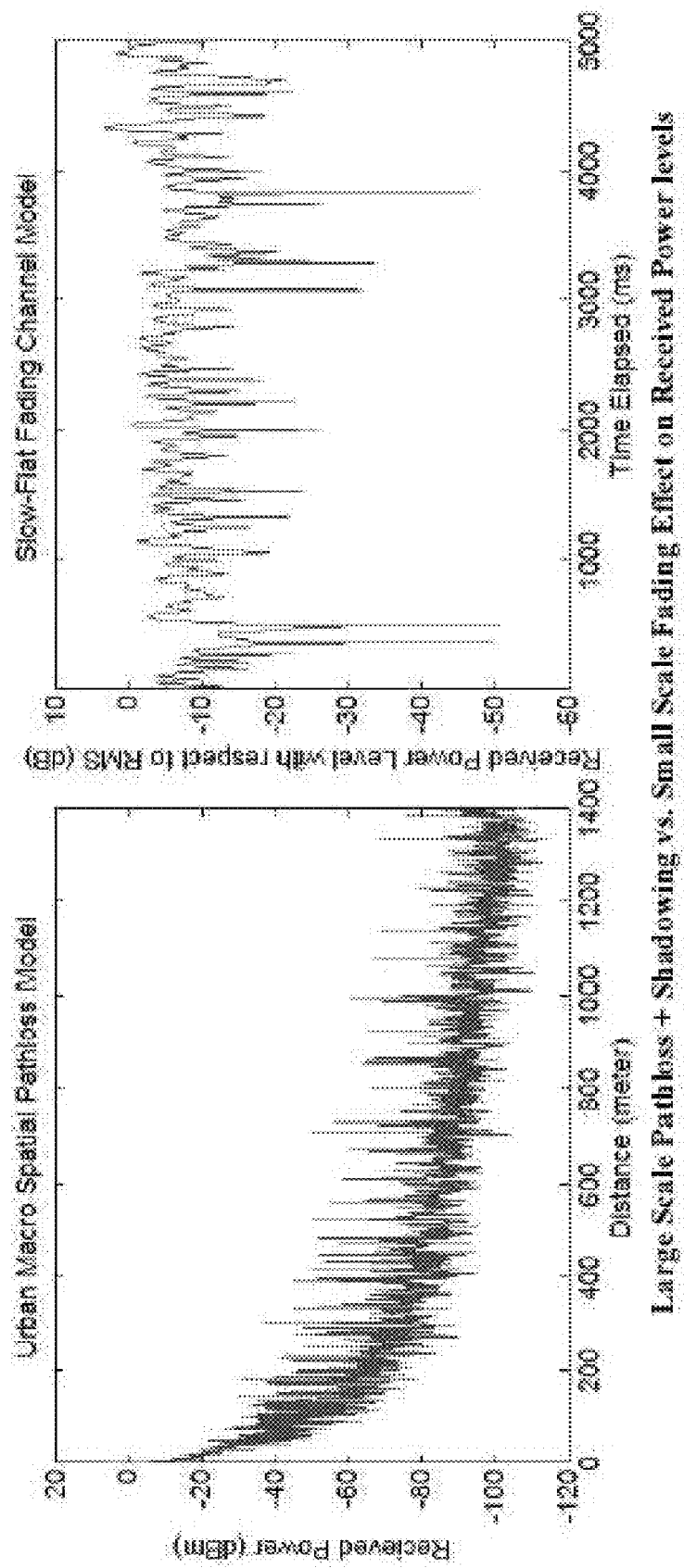
FIG. 5 illustrates an example of large scale pathloss and shadowing vs. small scale fading effect on received power levels.

In some example embodiments implementing a statistical mode, the scanning control module 420 can be configured to use one or more received signal quality measurements captured prior to the OOS condition to determine a rate of degradation of the received signal quality prior to the OOS condition. In cases of gradual decrease for mean signal quality values (e.g., RSRP, RSRQ, RSCP, RSSI and/or other values), it is likely that the wireless communication device 302 is either in a coverage hole or a remote area with no cellular coverage (e.g., a remote mountain or island with no cellular deployment) in which reacquiring network coverage may not be possible without a relatively substantial location change for the wireless communication device 302. In cases of sudden pathloss increase that results in an OOS condition, the wireless communication device 302 may be in a temporary deep shadowing scenario (e.g., an elevator in an urban setting that generally has proper cellular coverage) where reacquisition of network service could happen with a relatively minimal location change by the wireless communication device 302. FIG. 5 illustrates an example of received power vs. distance data for large scale pathloss in an urban scenario and an example of received power vs. time data in a small scale fading scenario, which illustrate how signal quality degradation models can be applied to estimate a cause (e.g., temporary deep shadowing versus entering a coverage hole) of an OOS condition in accordance with some example embodiments.

The scanning control module 420 can be configured to set a displacement threshold, $d_{threshold}$, which can, for example, be defined in terms of a scalar distance traveled threshold, based at least in part on the estimated nature (e.g., cause) of the OOS condition. The displacement threshold can represent a minimum threshold distance (e.g., an estimated distance) that the wireless communication device 302 needs to travel during the OOS condition before it is estimated that the wireless communication device 302 is likely to be within network coverage. The displacement threshold can be set to a higher magnitude (e.g., value) in scenarios where the mean pathloss gradually increases (e.g., in scenarios in which it is estimated that the OOS condition resulted from the wireless communication device 302 entering a coverage gap) compared to the scenarios where wireless communication device 302 lost coverage due to a sudden increase in pathloss (e.g., in scenarios in which it is estimated that the OOS condition resulted from a deep shadowing scenario). Thus, for example, if the rate of degradation of one or more received signal quality metrics prior to the OOS condition exceeds a threshold rate of degradation (e.g., a rate of degradation indicative of a deep shadowing condition), the scanning control module 420 can set a first displacement threshold, while if the rate of degradation of one or more received signal quality metrics prior to the OOS condition does not exceed the threshold rate of degradation, the scanning control module 420 can set a second displacement threshold. The first displacement threshold can have a smaller magnitude than the second displacement threshold, as the wireless communication device 302 may not have to travel as far to reacquire network service when experiencing a deep shadowing condition than when in a coverage hole.

The scanning control module 420 of some example embodiments can be configured to implement a deterministic mode for adaptively selecting a scan mode to use in the event of an OOS condition. Embodiments implementing a deterministic mode can leverage pre-harvested location-coverage mapping information mapping location data to corresponding indications of whether cellular network and/or other network coverage is available in respective locations. In this regard, the location-coverage mapping information can include mapping information indicative of an extent of network coverage within an area in which the wireless communication device is located when the OOS condition occurs. For example, the location-coverage mapping information can include a binary indication of whether coverage is available or unavailable at a given location. As another example, the location-coverage mapping information can include an indication of a network signal quality, such as in terms of RSRP, RSRQ, RSCP, RSSI, and/or the like, at a given location.

The location-coverage mapping information can, for example, be collected by the coverage information provisioning apparatus 306 from wireless communication devices, such as wireless communication device 302, operating within the system 300. In this regard, the coverage information provisioning apparatus 306 can be configured to harvest position data and corresponding network coverage information for devices operating within the system 300. The position data can, for example, be coordinate data, such as can be determined by the device and/or by the coverage information provisioning apparatus 306 for a corresponding network service measurement through usage of a satellite navigation system, such as Global Positioning System (GPS), GLONASS (Global Navigation Satellite System), Compass system, Galileo system, or other satellite navigation system. The coverage information provisioning apparatus 306 can be configured to store the harvested mapping information and identify regions according to the average observed cellular coverage (e.g., according to whether coverage is indicated as being available/unavailable on average in a location; and/or according to the average signal quality measurement in a location) for respective locations.

The location-coverage mapping information of some example embodiments can include mapping information collected over a number of users in various locations for multiple RATs. Thus, for example, the coverage information provisioning apparatus 306 of some example embodiments can be configured to maintain one set of location-coverage mapping information for LTE coverage, and another set of location-coverage mapping information for UMTS coverage.

Figure 6:
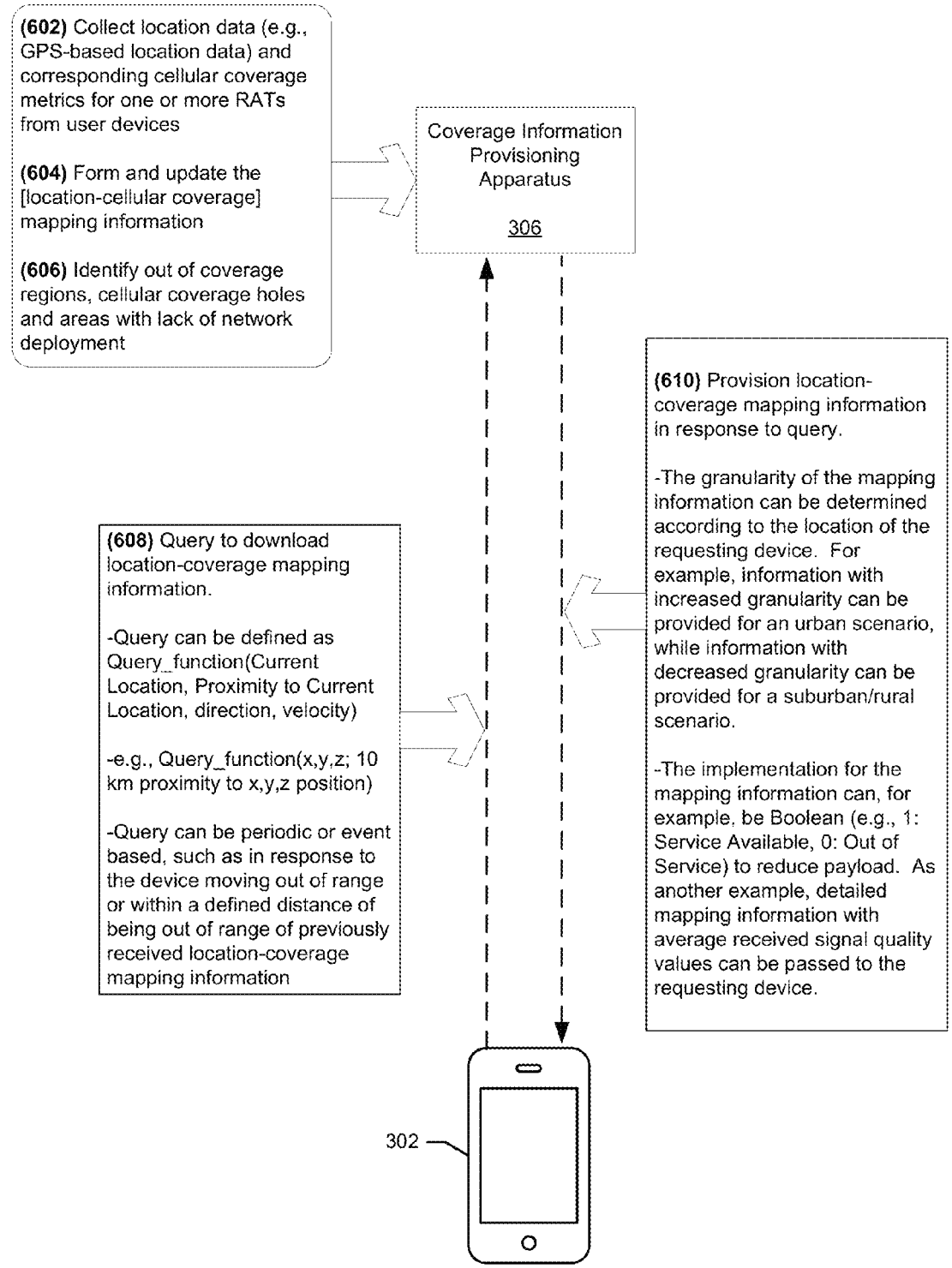
FIG. 6 illustrates provisioning of location-coverage mapping information in accordance with some example embodiments.

The coverage information provisioning apparatus 306 can be configured to provision location-coverage mapping information to the wireless communication device 302. An example of the provisioning of location-coverage mapping information to the wireless communication device 302 in accordance with some example embodiments is illustrated in FIG. 6. With reference to FIG. 6, operation 602 can include the coverage information provisioning apparatus 306 collecting location data and corresponding cellular coverage metrics for one or more RATs from user devices. The location data can, for example, be satellite positioning system-based location data, such as GPS-based location data. The cellular coverage metrics can, for example, include observed received signal quality metrics, such as RSRP, RSRQ, RSCP, RSSI, and/or the like. As another example, the cellular coverage metrics can additionally or alternatively include indications of whether network coverage is available/unavailable in respective locations.

Operation 604 can include the coverage information provisioning apparatus 306 forming and updating the location-cellular coverage mapping information based on data collected in operation 602. The collection of location data and corresponding coverage metrics and updating the location-coverage mapping information based on newly collected location data coverage metrics can be an ongoing process.

Operation 606 can include the coverage information provisioning apparatus 306 identifying out of coverage regions, cellular coverage holes, and areas with lack of network deployment.

In some example embodiments the coverage information provisioning apparatus 306 can be configured to proactively push location-coverage mapping information to the wireless communication device 302. Additionally or alternatively, in some example embodiments, such as the example illustrated in operation 608 of FIG. 6, the wireless communication device 302 can query the coverage information provisioning apparatus 306 to download location-coverage mapping information. The query can, for example, include an indication of a current location of the wireless communication device 302 such that the wireless communication device 302 can download location-coverage mapping information for a region proximate to the location of the wireless communication device 302. In this regard, the wireless communication device 302 of some example embodiments can download location-coverage mapping information for one or more areas proximate to the wireless communication device 302 at a given time rather than downloading global location-coverage mapping information.

In some example embodiments, the query of operation 608 can further specify a proximity or range relative to the current location of the wireless communication device 302 such that the wireless communication device 302 can define a range or area of location-coverage mapping information relative to the device's location to download.

In some embodiments, the query can additionally or alternatively include an indication of a direction of travel of the wireless communication device 302 and/or a velocity of the wireless communication device 302, which can be used by the coverage information provisioning apparatus 306 to select the location-coverage mapping information to provide to the wireless communication device 302 in response to the query. For example, location-coverage mapping information covering a defined distance of travel in the direction in which the wireless communication device 302 is moving (e.g., location-coverage mapping information for the next n miles in the direction of travel) can be provisioned to the wireless communication device 302. As another example, location-coverage mapping information covering an area which the wireless communication device 302 would traverse over a defined length of time given its direction of travel and/or velocity (e.g., location-coverage mapping information for the next n minutes of travel) can be provisioned to the wireless communication device 302.

As a non-limiting example, the query can be defined as: Query_function (Current Location, Proximity to Current Location, direction, velocity). "Current Location" can be a parameter specifying the location of the wireless communication device 302 at the time of the query. "Proximity to Current Location" can be a parameter specifying a range or area of location-coverage mapping information relative to the device's Current Location to download. "Direction" can be a parameter indicating a direction of travel of the wireless communication device 302 at the time of the query. "Velocity" can be a parameter specifying a velocity of the wireless communication device 302 at the time of the query. It will be appreciated, however, that one or more of the parameters in the example Query_function can be omitted in accordance with some example embodiments. Further, the Query_function of some example embodiments can include one or more parameters in addition to or in lieu of one or more of the parameters described in the example above. As a more particular example, if the wireless communication device 302 queries for location-coverage mapping information within 10 kilometers (km) of location [x,y,z], the Query can be specified as: Query_function (x,y,z; 10 km proximity to x,y,z position).

In some example embodiments, the query of operation 608 can be periodic. For example, the wireless communication device 302 of some example embodiments can be configured to query for location-coverage mapping information every half hour, every hour, and/or some other periodic unit of time. As another example, the wireless communication device 302 of some example embodiments can be configured to query for location-coverage mapping information in response to traveling a predefined distance, such as every 10 miles of travel. In some example embodiments, the query of operation 708 can be event based. For example, the wireless communication device 302 of some example embodiments can be configured to query for location-coverage mapping information in response to the device moving out of range and/or within a predefined distance (e.g., 1 mile) of being out of range of previously received location-coverage mapping information.

The coverage information provisioning apparatus 306 can be configured to receive the query of operation 608 and can be configured to respond by provisioning the requested location-coverage mapping information to the wireless communication device 302 in response to the query, as illustrated by operation 610. The granularity of the provisioned mapping information can be determined by the coverage information provisioning apparatus based at least in part on the location of the wireless communication device 302. For example, mapping information with increased (e.g., greater) granularity can be provided in an instance in which the wireless communication device 302 is located in an urban setting, while mapping information with a decreased (e.g., lesser) granularity can be provided in an instance in which the wireless communication device 302 is located in a suburban or rural setting.

The provisioned mapping information can have any of a variety of formats. For example, in some embodiments, the provisioned mapping information can be Boolean data. In such example embodiments, a Boolean value can be mapped to each of one or more respective locations for which mapping information is provisioned. For example, a Boolean value of "1" can indicate that service is available in the location, while a Boolean value of "0" can indicate that no service is available in the location (e.g., "out of service"). It will be appreciated, however, that these Boolean values can be reversed in some embodiments such that "0" can indicate that service is available, while "1" can indicate that the location is an out of service location. Embodiments utilizing Boolean values for mapping data can provide a small payload size for the message(s) used to provision mapping information, as in some such example embodiments, only a single Boolean value, or one Boolean value for each RAT for which location-coverage mapping information is provisioned, may be mapped to each respective location.

Additionally or alternatively, the provisioned mapping information of some example embodiments can include more detailed location-coverage mapping information than Boolean data. For example, the mapping information of some example embodiments can include a measured received signal quality value (e.g., average measured signal quality value) for each of one or more locations for which mapping information is provisioned. The received signal quality values can, for example, include RSRP, RSRQ, RSCP, RSSI, and/or the other signal quality values that can be mapped to respective locations for which mapping information is provisioned.

In some example embodiments, mapping information can be provisioned for multiple RATS. For example, in some example embodiments in which mapping information includes measured signal quality values, mapping information can be specified for various cellular RATs, such as LTE, UMTS, and GSM, as follows:

| Satellite Navigation System (e.g., GPS) Position Data | Average Cellular Coverage Metrics |
|---|---|
| (longitude, latitude, elevation) - [x, y, z] | RAT Type: [Cellular Power for Channel Estimation, Received Signal Quality] |
| $[x_1, y_1, z_1]$ | LTE: $[RSRP_1, RSRQ_1]$ |
|  | UMTS: $[RSCP_1, RSSI_1]$ |
| $[x_2, y_2, z_2]$ | UMTS: $[RSCP_2, RSSI_2]$ |
|  | GSM: $[RSSI_2]$ |
| $[x_3, y_3, z_3]$ | GSM: $[RSSI_3]$ |

The scanning control module 420 can be configured to use location-coverage mapping information provisioned to the wireless communication device 302 to determine whether an OOS condition is due to deployment limitations, or due to a deep shadowing condition. The scanning control module 420 can be further configured to define a displacement threshold based at least in part on the determined cause of the OOS condition. For example, if the location-coverage mapping information indicates that the wireless communication device 302 is in a location known to have weak coverage or no coverage, the scanning control module 420 can determine that the cause of the OOS condition is due to deployment limitations. However, if the location-coverage mapping information indicates that the wireless communication device 302 is in an area known to have good coverage, the scanning control module 420 can be configured to determine that the cause of the OOS condition is due to a deep shadowing condition. In the case that the scanning control module 420 determines that the cause of the OOS condition is deployment limitations, the scanning control module 420 can select to use a less aggressive scan mode and/or to set a larger displacement threshold than in the case that the scanning control module 420 determines that the cause of the OOS condition is a deep shadowing condition.

The scanning control module 420 can be configured to use the pre-downloaded location-coverage mapping information to define a displacement threshold according to a closest location(s) known to have network coverage compared to the location at which the OOS condition occurred. Thus, for example, if a location a half mile from the location of the wireless communication device 302 when the OOS condition occurred is known from the location-coverage mapping information to have coverage, the magnitude of the displacement threshold can be set to a half mile.

In some example embodiments implementing a deterministic mode, the scanning control module 420 can be configured to define a displacement threshold in terms of a threshold displacement vector, $\overline{A_{threshold}}$, according to a closest coverage region(s) compared to the location where OOS condition occurred. In embodiments in which the displacement threshold is defined as a displacement vector, the displacement vector can define a threshold displacement magnitude and an associated displacement direction (e.g., a direction of travel), which can, for example, correspond to a direction of travel of the wireless communication device 302 during the OOS condition. Thus, for example, if the wireless communication device 302 is traveling at a bearing of 270° and the closest location known to have network coverage at that bearing is one mile from the location of the wireless communication device 302 at the time the OOS condition occurred, a threshold displacement vector having a magnitude of one mile and direction of 270° can be defined. In some example embodiments, multiple threshold displacement vectors can be defined, with each threshold displacement vector having a different associated displacement direction and corresponding displacement magnitude determined based at least in part on the location-coverage mapping information such that different thresholds can be applied relative to the location at which the OOS condition occurred in scenarios in which the displacement direction of the wireless communication device 302 varies during the OOS condition.

The scanning control module 420 can be further configured to determine a displacement magnitude indicative of a distance traveled by the wireless communication device 302 during the OOS condition. In this regard, the displacement magnitude can be a distance of displacement of the wireless communication device 302 from the location at which the OOS condition occurred. The scanning control module 420 can be configured to compare the displacement magnitude to the displacement threshold set in response to the OOS condition (e.g., via statistical and/or deterministic mode techniques as described above) to determine if the displacement threshold has been satisfied. If the displacement magnitude exceeds the displacement threshold, the scanning control module 420 can be configured to determine that the displacement threshold has been satisfied. In embodiments in which the displacement threshold is defined in terms of a threshold displacement vector, such as when using deterministic mode to set a threshold displacement vector based on pre-downloaded location-coverage mapping information, the scanning control module 420 can be configured to determine if the displacement magnitude in the displacement direction (e.g., direction of travel) of the wireless communication device 302 satisfies the magnitude of a threshold displacement vector corresponding to the displacement direction of the wireless communication device 302.

In an instance in which the displacement threshold has been satisfied, the scanning control module 420 can be configured to use a more aggressive scan mode than if the displacement threshold has not been satisfied. In this regard, if the displacement threshold has been satisfied, it can be assumed that it is likely that network service can be reacquired. Thus, for example, if the displacement threshold has been satisfied, the scanning control module 420 can be configured to trigger an instantaneous scan and the scan frequency can be increased at least temporarily to provide for faster reacquisition of network service. If, however, the displacement threshold has not been satisfied, the scanning control module 420 can use a less aggressive scan mode to avoid excess battery consumption from performance of frequent scans in situations in which it is unlikely that network service can be reacquired.

The scanning control module 420 can be configured to use any of a variety of techniques to determine a displacement magnitude and/or displacement direction for the wireless communication device 302 during the OOS condition. For example, in embodiments in which the wireless communication device 302 includes a satellite navigation system sensor, such as a GPS sensor, the scanning control module 420 can be configured to use position information that can be determined via GPS and/or other satellite navigation system to determine a distance traveled by the wireless communication device 302 during the OOS condition and/or a displacement direction of the wireless communication device 302. As another example, in embodiments in which the wireless communication device 302 includes an accelerometer, the scanning control module 420 can be configured to use accelerometer measurements to approximate a displacement magnitude and/or displacement direction for the wireless communication device 302 during the OOS condition.

In some example embodiments in which the wireless communication device 302 includes a satellite navigation system sensor and an accelerometer, usage of the satellite navigation system sensor can be preferred to the accelerometer for determination of displacement magnitude and/or displacement magnitude. Thus, for example, the satellite navigation system sensor can be used to determine a displacement magnitude and/or displacement direction for the wireless communication device 302 if satellite navigation system service is available during the OOS condition. However, if satellite navigation system service is also out of service during the OOS condition, the accelerometer can be used to approximate the displacement magnitude and/or displacement direction of the wireless communication device 302. It will be appreciated, however, that some example embodiments can use accelerometer and/or other available location and/or sensor data to supplement position data that can be obtained through the use of a satellite navigation system.

In some example embodiments, the scanning control module 420 can be configured to select an adaptive scan mode to apply in an OOS condition based at least in part on user triggered events and conditions. In this regard, the scanning control module 420 can be configured to determine based at least in part on user triggered events preceding (e.g., immediately and/or otherwise closely preceding) the OOS condition and/or user triggered events occurring during the OOS condition whether the device user desires to perform an action requiring network service during the OOS condition. In such example embodiments, the scanning control module 420 can be configured to monitor for user input to the user interface 418 that can be indicative of a user desire to perform an action requiring network service during the OOS condition. For example, the scanning control module 420 can be configured to monitor for touch screen events; an input to a keypad; user attempt to initiate a call (e.g., a voice call and/or data call); user attempt to initiate an emergency call; a pending text message, such as a short message service (SMS) message, multimedia messaging service (MMS) message, and/or other text message; and/or other user triggered events that can be indicative of a user desire to perform an action requiring network service for performance.

In an instance in which a user triggered event and/or condition indicative of a user desire to perform an action requiring network service for performance is detected, the scanning control module 420 of some example embodiments can be configured to use a more aggressive scan mode to scan for network coverage than would otherwise be used so as to support faster recovery from the OOS condition. In some such example embodiments, the scanning control module 420 can be configured to trigger an instantaneous scan and adapt the scan frequency according to device mobility conditions in response to a user triggered event and/or condition indicative of a user desire to perform an action requiring network service for performance. Additionally or alternatively, the scanning control module 420 of some such example embodiments can be configured to use a more aggressive scan mode even if a displacement threshold, such as can be set using the statistical and/or deterministic modes described above, has not been satisfied by mobility of the wireless communication device 302 during the OOS condition.

Figure 7:
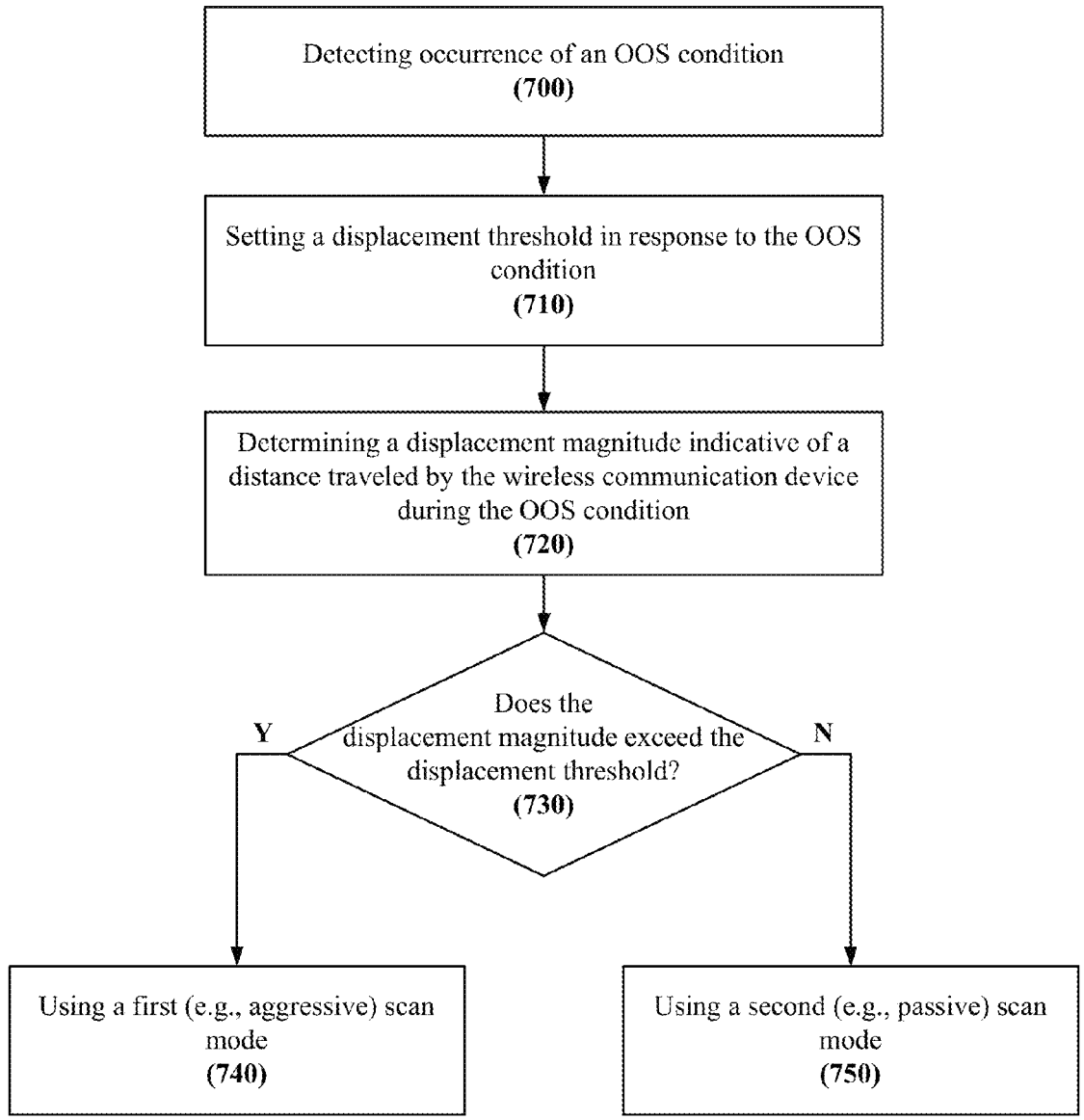
FIG. 7 illustrates a flowchart according to an example method for adaptive out of service scanning according to some example embodiments.

FIG. 7 illustrates a flowchart according to an example method for adaptive out of service scanning according to some example embodiments. In this regard, FIG. 7 illustrates operations that can be performed by the wireless communication device 302 of some example embodiments. One or more of processing circuitry 410, processor 412, memory 414, transceiver 416, user interface 418, or scanning control module 420 can, for example, provide means for performing the operations illustrated in and described with respect to FIG. 7.

Operation 700 can include the wireless communication device 302 detecting occurrence of an OOS condition. Operation 710 can include the wireless communication device 302 setting a displacement threshold in response to the OOS condition. The displacement threshold can, for example, be set to a magnitude indicative of a minimum threshold distance that it is estimated that the wireless communication device 302 needs to travel from its location at the point of occurrence of the OOS condition before it is estimated that the wireless communication device 302 is likely to be within network coverage such that network service can be reacquired. The displacement threshold can, for example, be set using statistical mode and/or deterministic mode techniques in accordance with one or more embodiments as described above.

Operation 720 can include the wireless communication device 302 determining a displacement magnitude indicative of a distance traveled by the wireless communication device during the OOS condition. Operation 730 can include the wireless communication device 302 comparing the displacement magnitude determined in operation 720 to the displacement threshold set in operation 710 to determine whether the displacement magnitude exceeds the displacement threshold.

In an instance in which it is determined in operation 730 that the displacement magnitude exceeds the displacement threshold, the method can proceed to operation 740, which can include the wireless communication device 302 using a first scan mode (e.g., an aggressive scan mode) to scan for network coverage. If, however, it is determined in operation 730 that the displacement magnitude exceeds the displacement threshold, the method can instead proceed to operation 750, which can include the wireless communication device 302 using a second scan mode (e.g., a passive scan mode) to scan for network coverage. The first scan mode can have a greater scan frequency than the second scan mode. In this regard, a more aggressive scan mode can be used in an instance in which the displacement magnitude exceeds the displacement threshold, as it can be assumed that it is likely that network service can be reacquired after the wireless communication device 302 has traveled at least the displacement threshold distance during the OOS condition. However, a less aggressive, or passive, scan mode can be used when the displacement magnitude does not exceed the displacement threshold in order to reduce battery consumption, as it can be unlikely that network service can be successfully reacquired if the wireless communication device 302 has not traveled at least the displacement threshold distance during the OOS condition.

In some example embodiments, if it is determined at operation 730 that the displacement magnitude does not exceed the displacement threshold, operations 720 and 730 can be repeated (e.g., periodically) during the OOS condition until either network service is reacquired using the second scan mode or until the wireless communication device 302 has traveled a distance during the OOS condition that is sufficient to satisfy the displacement threshold and has switched to using the first (e.g., aggressive) scan mode in response to the displacement threshold being satisfied.

Figure 8:
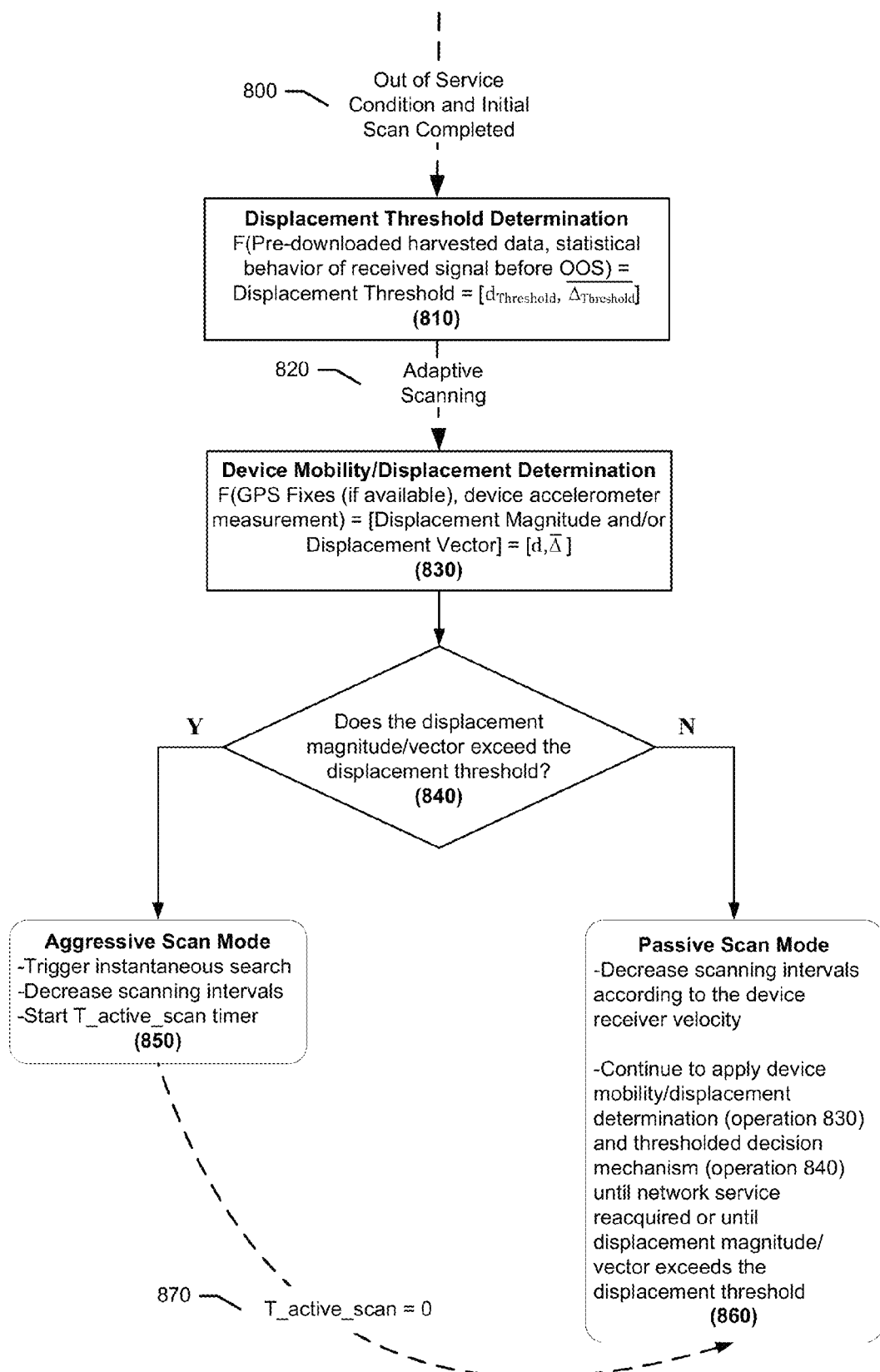
FIG. 8 illustrates a flowchart according to another example method for adaptive out of service scanning according to some example embodiments.

FIG. 8 illustrates a flowchart according to another example method for adaptive out of service scanning according to some example embodiments. In this regard, FIG. 8 illustrates operations that can be performed by the wireless communication device 302 in accordance with performing some embodiments of the method of FIG. 7. One or more of processing circuitry 410, processor 412, memory 414, transceiver 416, user interface 418, or scanning control module 420 can, for example, provide means for performing the operations illustrated in and described with respect to FIG. 8.

As illustrated by operation 800, the method can begin with the wireless communication device 302 being in an OOS condition and having completed an initial scan without successfully reacquiring network service. Operation 810 can include the wireless communication device 302 setting a displacement threshold. The displacement threshold can, for example, be set to a magnitude indicative of a minimum threshold distance that it is estimated that the wireless communication device 302 needs to travel from its location at the point of occurrence of the OOS condition before it is estimated that the wireless communication device 302 is likely to be within network coverage such that network service can be reacquired. In this regard, operation 810 can correspond to an embodiment of operation 710 as described with respect to FIG. 7.

In some example embodiments, operation 810 can include setting the displacement threshold as a function of pre-downloaded harvested data indicative of location-coverage mapping information in the vicinity of the wireless communication device 302, such as in accordance with one or more embodiments implementing a deterministic mode, as described above. The pre-downloaded harvested data can be provisioned to the wireless communication device 302 by the coverage information provisioning apparatus 306, such as by the process illustrated in and discussed with respect to FIG. 6. In some embodiments in which the displacement threshold is set as a function of location-coverage mapping information, the displacement threshold can be defined in terms of one or more threshold displacement vectors, which can be represented as $\overline{\Delta threshold}$. A threshold displacement vector can define a threshold displacement magnitude and an associated displacement direction (e.g., a direction of travel), which can, for example, correspond to a direction of travel of the wireless communication device 302 during the OOS condition. In this regard, a threshold displacement vector can define a minimum threshold distance that it is estimated that the wireless communication device 302 needs to travel in a given displacement direction from its location at the point of occurrence of the OOS condition before it is estimated based on location-coverage mapping information that the wireless communication device 302 is likely to be within network coverage such that network service can be reacquired.

In some example embodiments, operation 810 can additionally or alternatively include the wireless communication device 302 setting a displacement threshold, $d_{threshold}$, as a function of statistical behavior of a received signal prior to the OOS condition. For example, the displacement threshold can be set based at least in part on a rate of degradation of the received signal quality prior to the OOS condition, such as in accordance with one or more embodiments implementing a statistical mode, as described above. In some example embodiments, statistical behavior of the received signal prior to the OOS condition can be used to set the displacement threshold in an instance in which pre-downloaded location-coverage mapping information is not available for the area in which the wireless communication device 302 is located.

Operation 820 can include the wireless communication device 302 initiating an adaptive scanning mode based on the displacement threshold set in operation 810. Operation 830 can include the wireless communication device 302 determining the displacement of the device during the OOS condition. In some example embodiments, operation 830 can include the wireless communication device 302 determining a displacement magnitude, d, indicative of a distance traveled by the wireless communication device during the OOS condition. In some example embodiments, such as some embodiments in which operation 810 includes defining a threshold displacement vector, $\overline{\Delta threshold}$, operation 830 can include determining a displacement vector, $\overline{\Delta}$, defined by a displacement magnitude, d, indicative of a distance traveled by the wireless communication device during the OOS condition and an associated displacement direction indicative of a direction of travel of the wireless communication device 302 during the OOS condition.

Operation 840 can include the wireless communication device 302 determining whether the displacement magnitude/vector determined in operation 830 exceeds the displacement threshold set in operation 810. In this regard, operation 840 can correspond to an embodiment of operation 730.

In an instance in which it is determined in operation 840 that the displacement magnitude/vector determined in operation 830 does exceed the displacement threshold set in operation 810, the method can proceed to operation 850, which can include the wireless communication device 302 using an aggressive scan mode to scan for network coverage. Operation 850 can, for example, correspond to an embodiment of operation 740. In some example embodiments, using the aggressive scan mode can include the wireless communication device 302 triggering an instantaneous search. If the initial search is unsuccessful, the aggressive scan mode can include gradually decreasing scanning intervals for subsequent scans via a backoff mechanism. However, the scanning frequency can be greater than a scan frequency that can be used in a passive scan mode in operation 860 in an instance in which the displacement magnitude/vector determined in operation 830 does not exceed the displacement threshold set in operation 810. Operation 850 can also include setting a scanning timer, T_active_scan timer, when the aggressive scan mode is triggered. T_active_scan timer can, for example, be a countdown timer that can have an initial value that can vary with implementation. However, if the value of T_active_scan timer reaches 0 without the wireless communication device 302 successfully reacquiring network service, the wireless communication device 302 can transition to the passive scan mode of operation 860, as illustrated by operation 870.

If, on the other hand, it is determined at operation 840 that the displacement magnitude/vector determined in operation 830 does not exceed the displacement threshold set in operation 810, operation 850 can be omitted and the method can instead proceed to operation 860, which can include the wireless communication device 302 using a passive scan mode to scan for network coverage. Operation 860 can, for example, correspond to an embodiment of operation 750. The passive scan mode can have a lower scan frequency than the aggressive scan mode. In some example embodiments, operation 860 can include decreasing and/or otherwise adjusting scanning intervals in the passive scan mode according to the device receiver velocity.

In some example embodiments, operation 860 can include the wireless communication device 302 continuing to perform operations 830 and 840 (e.g., periodically) during the OOS condition until either network service is reacquired using the passive scan mode or until the wireless communication device 302 has traveled a distance during the OOS condition that is sufficient for the displacement magnitude/vector of the device during the OOS condition to satisfy the displacement threshold. In the case that the displacement magnitude/vector of the device is determined at some point during the performance of operation 860 to exceed the displacement threshold and network service has not yet been reacquired, the wireless communication device 302 can transition from the passive scan mode to the aggressive scan mode of operation 850.

Figure 9:
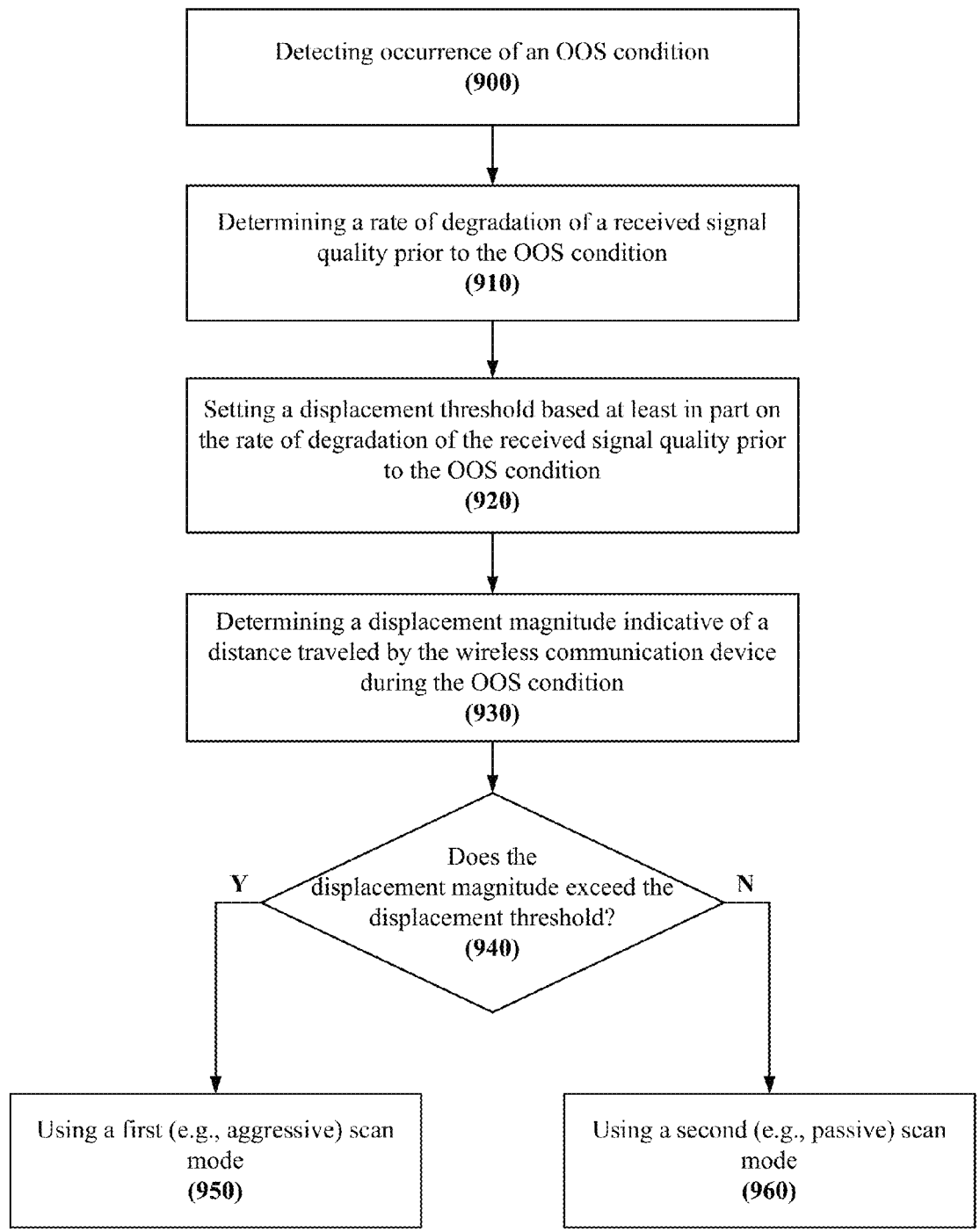
FIG. 9 illustrates a flowchart according to an example method for adaptive out of service scanning based on a rate of degradation in a received signal quality prior to an out of service condition according to some example embodiments.

FIG. 9 illustrates a flowchart according to an example method for adaptive out of service scanning based on a rate of degradation in a received signal quality prior to an out of service condition according to some example embodiments. In this regard, FIG. 9 illustrates operations that can be performed by the wireless communication device 302 in accordance with performing some embodiments of the method of FIG. 7 in which statistical characteristics of a received signal prior to the OOS condition can be used to set the displacement threshold, such as in accordance with one or more embodiments implementing a statistical mode as described above. One or more of processing circuitry 410, processor 412, memory 414, transceiver 416, user interface 418, or scanning control module 420 can, for example, provide means for performing the operations illustrated in and described with respect to FIG. 9.

Operation 900 can include the wireless communication device 302 detecting occurrence of an OOS condition. In this regard, operation 900 can correspond to an embodiment of operation 700.

Operation 910 can include the wireless communication device 302 determining a rate of degradation of a received signal quality prior to the OOS condition. The rate of degradation can, for example, be determined through or more received signal quality measurements captured prior to the OOS condition. The received signal quality measurements can include RSRP, RSRQ, RSCP, RSSI, and/or other signal quality measurements depending on a type of RAT which was used by the wireless communication device 302 prior to the OOS condition. Operation 920 can include the wireless communication device 202 setting a displacement threshold (e.g., $d_{threshold}$) based at least in part on the rate of degradation of the received signal quality prior to the OOS condition. In this regard, operation 920 can be an embodiment of operation 710.

As an example, if the rate of degradation of the received signal quality prior to the OOS condition exceeds a threshold rate of degradation, the wireless communication device 302 can estimate that the cause of the OOS condition is a deep shadowing condition, and can set a first displacement threshold at operation 920. If, however, the rate of degradation of the received signal quality does not exceed the threshold rate of degradation, the wireless communication device 302 can estimate that the cause of the OOS condition is that the wireless communication device 302 is in a coverage hole, and can set a second displacement threshold at operation 920. The first displacement threshold can have a smaller magnitude than the second displacement threshold, as it can be estimated that network service can be reacquired after a smaller distance of travel in a deep shadowing scenario than in a scenario in which the wireless communication device 302 is in a coverage hole.

Operation 930 can include the wireless communication device 302 determining a displacement magnitude indicative of a distance traveled by the wireless communication device 302 during the OOS condition. In this regard, operation 930 can correspond to an embodiment of operation 720. Operation 940 can include the wireless communication device 302 comparing the displacement magnitude determined in operation 930 to the displacement threshold set in operation 920 to determine whether the displacement magnitude exceeds the displacement threshold. In this regard, operation 940 can correspond to an embodiment of operation 730.

In an instance in which it is determined in operation 940 that the displacement magnitude exceeds the displacement threshold, the method can proceed to operation 950, which can include the wireless communication device 302 using a first scan mode (e.g., an aggressive scan mode) to scan for network coverage. In this regard, operation 950 can correspond to an embodiment of operation 740. If, however, it is determined in operation 940 that the displacement magnitude exceeds the displacement threshold, the method can instead proceed to operation 960, which can include the wireless communication device 302 using a second scan mode (e.g., a passive scan mode) to scan for network coverage. In this regard, operation 960 can correspond to an embodiment of operation 750. The first scan mode can have a greater scan frequency than the second scan mode. In this regard, a more aggressive scan mode can be used in an instance in which the displacement magnitude exceeds the displacement threshold, as it can be assumed that it is likely that network service can be reacquired after the wireless communication device 302 has traveled at least the displacement threshold distance during the OOS condition. However, a less aggressive, or passive, scan mode can be used when the displacement magnitude does not exceed the displacement threshold in order to reduce battery consumption, as it can be unlikely that network service can be successfully reacquired if the wireless communication device 302 has not traveled at least the displacement threshold distance during the OOS condition.

In some example embodiments, if it is determined at operation 940 that the displacement magnitude does not exceed the displacement threshold, operations 930 and 940 can be repeated (e.g., periodically) during the OOS condition until either network service is reacquired using the second scan mode or until the wireless communication device 302 has traveled a distance during the OOS condition that is sufficient to satisfy the displacement threshold and has switched to using the first (e.g., aggressive) scan mode in response to the displacement threshold being satisfied.

Figure 10:
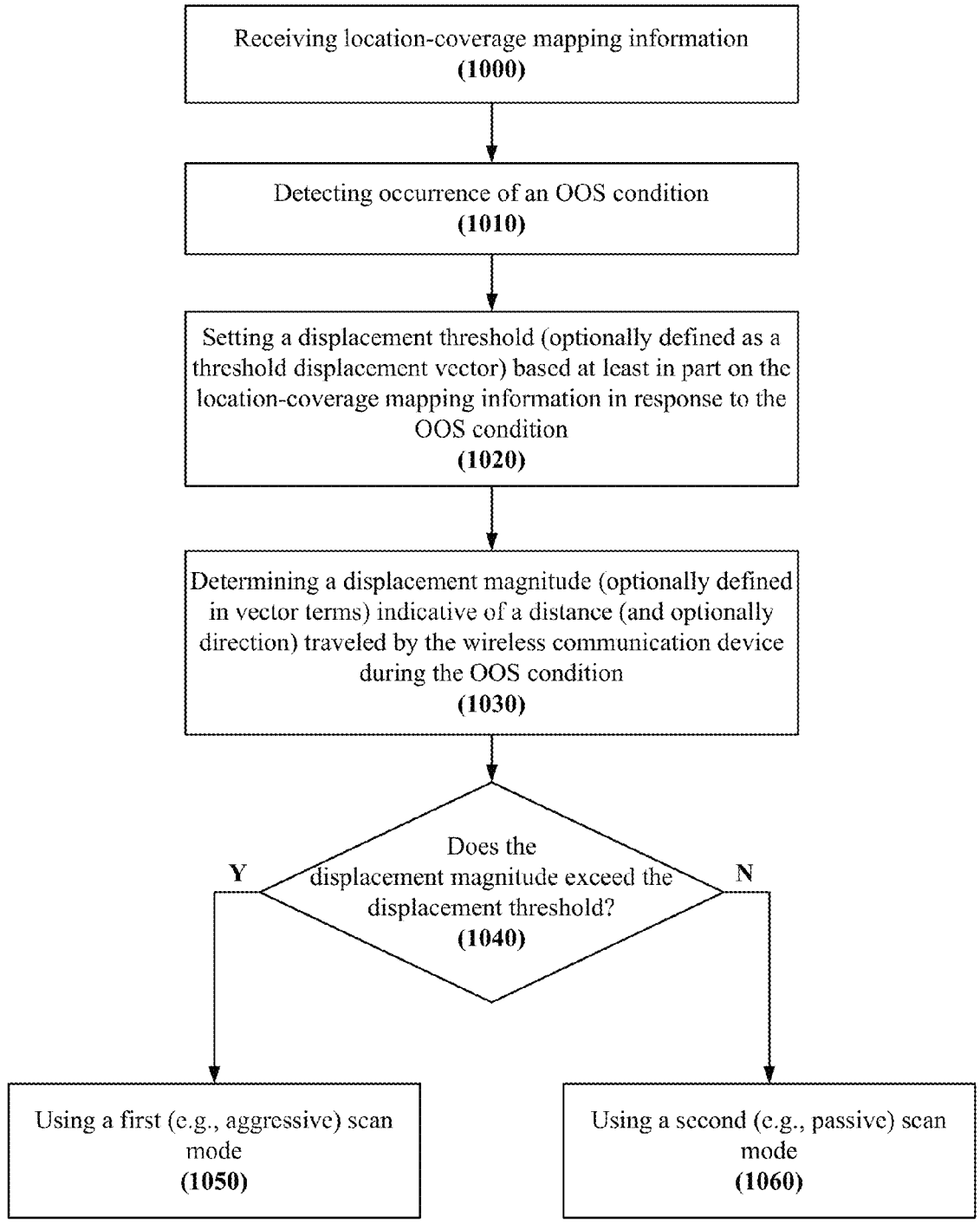
FIG. 10 illustrates a flowchart according to an example method for adaptive out of service scanning based on location-coverage mapping information according to some example embodiments.

FIG. 10 illustrates a flowchart according to an example method for adaptive out of service scanning based on location-coverage mapping information according to some example embodiments. In this regard, FIG. 10 illustrates operations that can be performed by the wireless communication device 302 in accordance with performing some embodiments of the method of FIG. 7 in which pre-downloaded location-coverage mapping information can be used to set the displacement threshold, such as in accordance with one or more embodiments implementing a deterministic mode as described above. One or more of processing circuitry 410, processor 412, memory 414, transceiver 416, user interface 418, or scanning control module 420 can, for example, provide means for performing the operations illustrated in and described with respect to FIG. 10.

Operation 1000 can include the wireless communication device 302 receiving location-coverage mapping information. The location-coverage mapping information can be provisioned to the wireless communication device 302 by the coverage information provisioning apparatus 306, such as by the process illustrated in and described with respect to FIG. 6.

Operation 1010 can include the wireless communication device 302 detecting occurrence of an OOS condition. In this regard, operation 1010 can correspond to an embodiment of operation 700.

Operation 1020 can include the wireless communication device 302 setting a displacement threshold based at least in part on the location-coverage mapping information received in operation 1000 in response to the OOS condition. In this regard, operation 1020 can, for example, include the wireless communication device 302 using the location-coverage mapping information to determine a distance which the wireless communication device 302 has to travel from the position of occurrence of the OOS condition before the wireless communication device 302 is in a location indicated as having network coverage by the location-coverage mapping information. In some example embodiments, operation 1020 can include defining the displacement threshold as a threshold displacement vector, $\overline{\Delta threshold}$. The threshold displacement vector can define a threshold displacement magnitude and an associated displacement direction (e.g., a direction of travel), which can, for example, correspond to a direction of travel of the wireless communication device 302 during the OOS condition. In this regard, a threshold displacement vector can define a minimum threshold distance that it is estimated that the wireless communication device 302 needs to travel in a given displacement direction from its location at the point of occurrence of the OOS condition before it is estimated based on location-coverage mapping information that the wireless communication device 302 is likely to be within network coverage such that network service can be reacquired. Operation 1020 can accordingly correspond to an embodiment of operation 710.

Operation 1030 can include the wireless communication device 302 determining a displacement magnitude indicative of a distance traveled by the wireless communication device 302 during the OOS condition. In some example embodiments, such as some embodiments in which the displacement threshold set in operation 1020 is defined as a threshold displacement vector, operation 1020 can include determining a displacement vector, $\overline{\Delta}$, defined by a displacement magnitude, d, indicative of a distance traveled by the wireless communication device during the OOS condition and an associated displacement direction indicative of a direction of travel of the wireless communication device 302 during the OOS condition. Operation 1030 can correspond to an embodiment of operation 720.

Operation 1040 can include the wireless communication device 302 comparing the displacement magnitude determined in operation 1030 to the displacement threshold set in operation 1020 to determine whether the displacement magnitude exceeds the displacement threshold. In embodiments in which the displacement threshold is defined as a threshold displacement vector and a displacement vector is determined in operation 1030, operation 1040 can include comparing the displacement vector determined in operation 1030 to a threshold displacement vector having a corresponding displacement direction to the displacement vector determined in operation 1030. In this regard, given varying directions of travel of the wireless communication device, different threshold displacement magnitudes can be defined for different directions of travel. Operation 104 can correspond to an embodiment of operation 730.

In an instance in which it is determined in operation 1040 that the displacement magnitude exceeds the displacement threshold, the method can proceed to operation 1050, which can include the wireless communication device 302 using a first scan mode (e.g., an aggressive scan mode) to scan for network coverage. In this regard, operation 1050 can correspond to an embodiment of operation 740. If, however, it is determined in operation 1040 that the displacement magnitude exceeds the displacement threshold, the method can instead proceed to operation 1060, which can include the wireless communication device 302 using a second scan mode (e.g., a passive scan mode) to scan for network coverage. In this regard, operation 1060 can correspond to an embodiment of operation 750. The first scan mode can have a greater scan frequency than the second scan mode. In this regard, a more aggressive scan mode can be used in an instance in which the displacement magnitude exceeds the displacement threshold, as it can be assumed that it is likely that network service can be reacquired after the wireless communication device 302 has traveled at least the displacement threshold distance during the OOS condition. However, a less aggressive, or passive, scan mode can be used when the displacement magnitude does not exceed the displacement threshold in order to reduce battery consumption, as it can be unlikely that network service can be successfully reacquired if the wireless communication device 302 has not traveled at least the displacement threshold distance during the OOS condition.

In some example embodiments, if it is determined at operation 1040 that the displacement magnitude does not exceed the displacement threshold, operations 1030 and 1040 can be repeated (e.g., periodically) during the OOS condition until either network service is reacquired using the second scan mode or until the wireless communication device 302 has traveled a distance during the OOS condition that is sufficient to satisfy the displacement threshold and has switched to using the first (e.g., aggressive) scan mode in response to the displacement threshold being satisfied.

Some example embodiments implement both statistical and deterministic modes for setting a displacement threshold in response to an OOS condition. In some such example embodiments, a deterministic mode method can be used to set the displacement threshold if location-coverage mapping information for the area in which the wireless communication device 302 is located has been downloaded by the wireless communication device 302 prior to the OOS condition. However, if location-coverage mapping information is unavailable for the area in which the wireless communication device 302 is located, a statistical mode approach based on degradation of received signal quality prior to the OOS condition can be used to set the displacement threshold.

Figure 11:
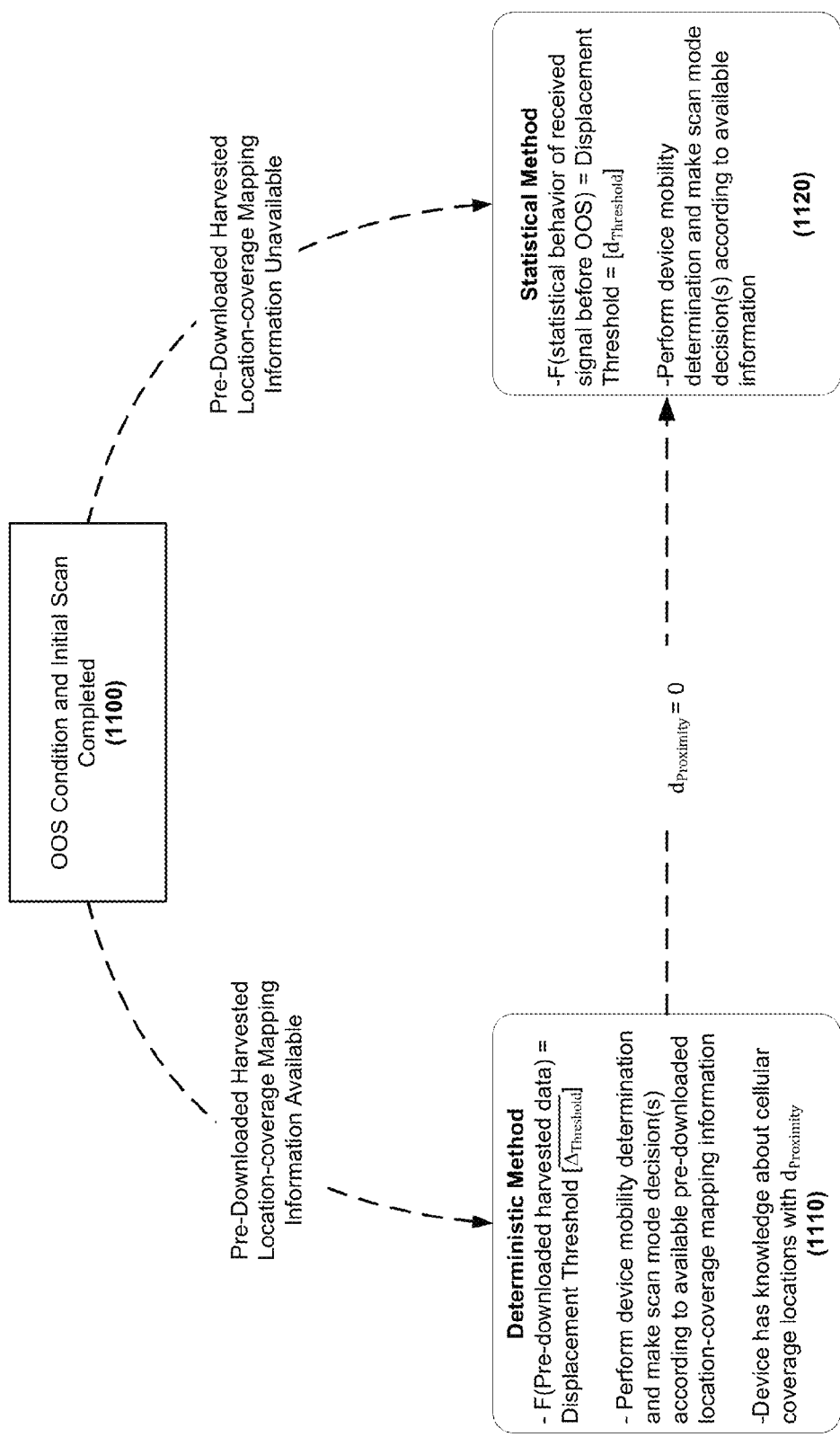
FIG. 11 illustrates a state diagram for selecting between application of a deterministic mode and a statistical mode for selecting an out of service scan mode according to some example embodiments.

FIG. 11 illustrates a state diagram for selecting between application of a deterministic mode and a statistical mode for selecting an out of service scan mode according to some example embodiments integrating both statistical and deterministic modes for setting a displacement threshold in response to an OOS condition. At state 1100, the wireless communication device 302 can be experiencing an OOS condition and can have completed an initial scan without successfully reacquiring network service.

If, pre-downloaded harvested location-coverage mapping information is available for the area in which the wireless communication device 302 is located, the device can transition from state 1100 to state 1110 and can apply a deterministic mode method for setting a displacement threshold and selecting a scan mode. In some example embodiments, state 1110 can include the wireless communication device 302 setting a displacement threshold defined as a threshold displacement vector, $\overline{\Delta threshold}$, as a function of the pre-downloaded harvested data. The wireless communication device 302 can make a scan mode decision(s) based on device mobility during the OOS condition in accordance with the pre-downloaded location-coverage mapping information. In this regard, for example, if a displacement vector, $\overline{\Delta}$, defining a displacement magnitude and direction of travel of the wireless communication device 302 exceeds a $\overline{\Delta threshold}$ set for a corresponding direction of travel based on the pre-downloaded harvested data, the wireless communication device 302 can use an aggressive scan mode to scan for network coverage. If, however, mobility of the wireless communication device 302 during the OOS condition has not satisfied $\overline{\Delta\text{threshold}}$, the wireless communication device can apply a less aggressive, or passive, scan mode to conserve battery power.

If, however, pre-downloaded harvested location-coverage mapping information is not available for the area in which the wireless communication device 302 is located, the device can transition from state 1100 to state 1120 and can apply a statistical mode method for setting a displacement threshold and selecting a scan mode. In some example embodiments, state 1120 can include the wireless communication device 302 setting a displacement threshold, $d_{threshold}$, as a function of statistical behavior of the received signal before the OOS condition. The wireless communication device 302 can make a scan mode decision(s) based on device mobility during the OOS condition in accordance with the defined displacement threshold. In this regard, for example, if the wireless communication 302 travels a distance during the OOS condition exceeding $d_{threshold}$, the wireless communication device 302 can use an aggressive scan mode to scan for network coverage, as it can be estimated that it is likely that the wireless communication device 302 is located in an area having network coverage and can successfully reacquire network service. If, however, mobility of the wireless communication device 302 during the OOS condition has not satisfied $d_{threshold}$, the wireless communication device can apply a less aggressive, or passive, scan mode to conserve battery power.

In some example embodiments, the wireless communication device 302 can have knowledge about the proximity of cellular coverage locations to the position of the wireless communication device 302 from the pre-downloaded harvested location-coverage mapping information when operating in state 1110. This proximity can be defined as $d_{Proximity}$. In the event that $d_{Proximity}$ is 0, the wireless communication device 302 of some example embodiments can transition from state 1110 to state 1120 and can apply the statistical mode method for setting a displacement threshold and selecting a scan mode.

Figure 12A:
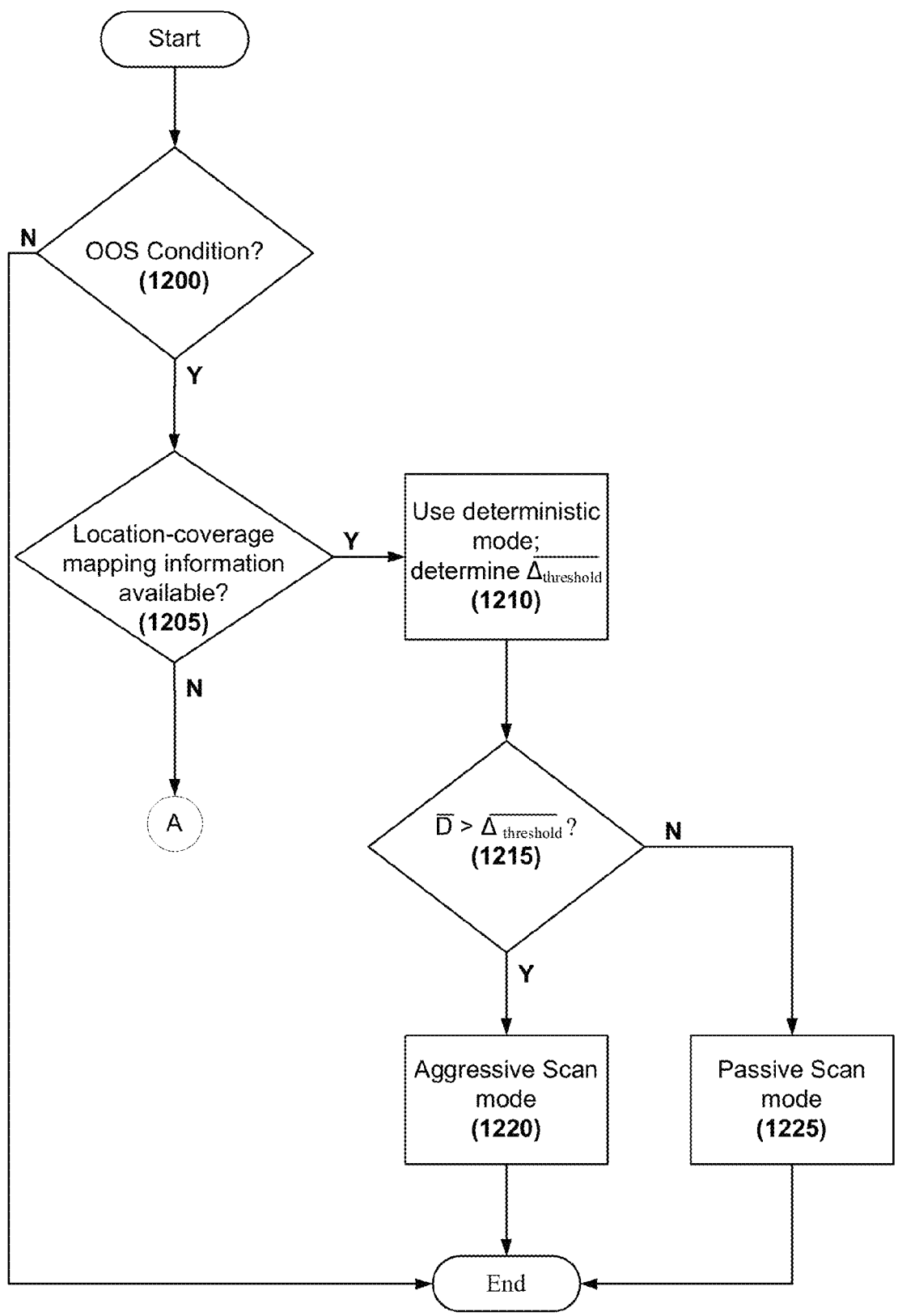
FIGS. 12A and 12B illustrate a flowchart according to an example method for adaptive out of service scanning according to some example embodiments.
Figure 12B:
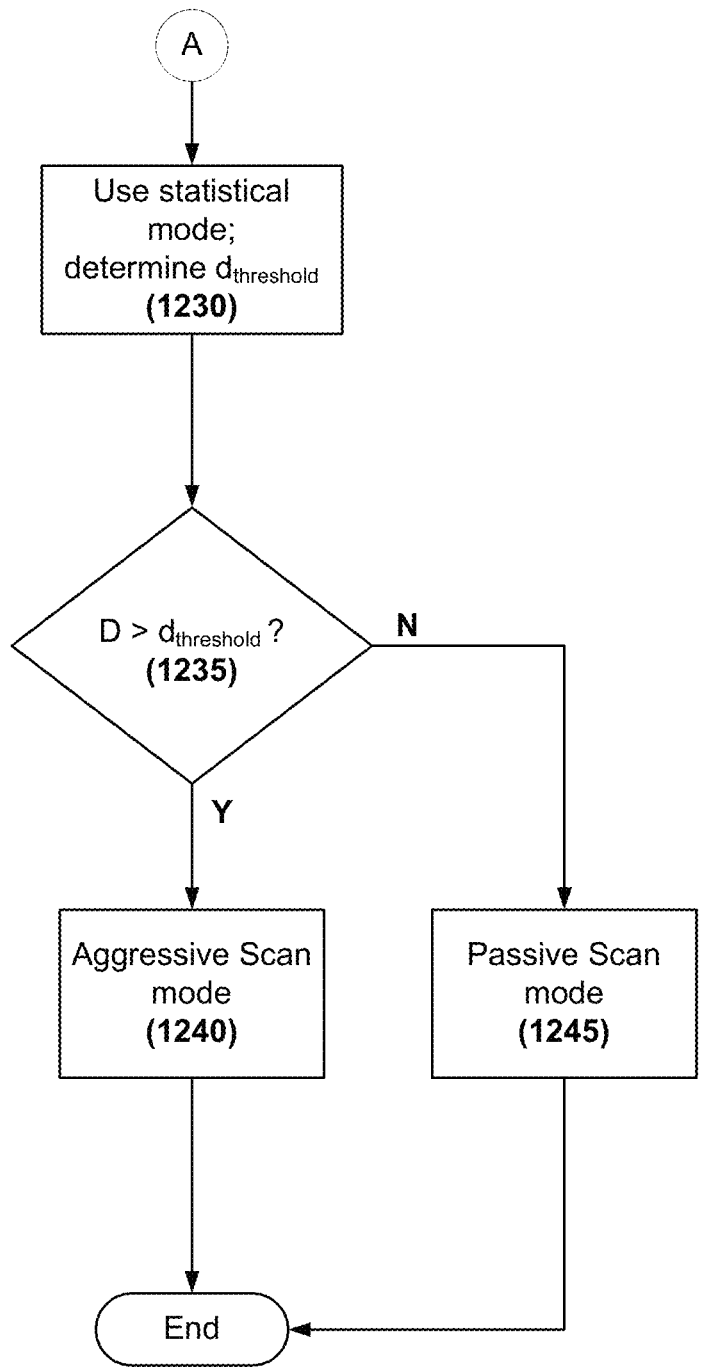

FIGS. 12A and 12B illustrate a flowchart according to an example method for adaptive out of service scanning according to some example embodiments. In this regard, FIGS. 12A and 12B illustrate operations that can be performed by the wireless communication device 302 in accordance with some example integrating both statistical and deterministic mode methods. One or more of processing circuitry 410, processor 412, memory 414, transceiver 416, user interface 418, or scanning control module 420 can, for example, provide means for performing the operations illustrated in and described with respect to FIGS. 12A and 12B.

Referring first to FIG. 12A, operation 1200 can include the wireless communication device 302 determining whether it is operating in an OOS condition. If the wireless communication device 302 is not operating in an OOS condition, then the method can terminate. If, however, the wireless communication device 302 is operating in an OOS condition, the method can proceed to operation 1205, which can include the wireless communication device 302 determining if there location-coverage mapping information is available for the area in which the wireless communication device 302 is located.

If it is determined in operation 1205 that location-coverage mapping information is available, the method can proceed to operation 1210, which can include the wireless communication device 302 selecting to use a deterministic mode and setting one or more threshold displacement vectors, $\overline{\Delta\text{threshold}}$. In this regard, operation 1210 can correspond to an embodiment of operation 1020. Operation 1215 can include the wireless communication device 302 determining a displacement vector, $\overline{D}$, representing a displacement direction and displacement magnitude of mobility of the wireless communication device 302 during the OOS condition. $\overline{D}$ can, for example, be determined from satellite navigation system positioning data, location data, accelerometer data, some combination thereof, or the like, as described above. Operation 1215 can further include the wireless communication device 302 determining whether $\overline{D}$ exceeds a $\overline{\Delta\text{threshold}}$ having a corresponding displacement direction. In this regard, operation 1215 can correspond to an embodiment of operations 1030 and 1040. If it is determined in operation 1215 that $\overline{D}>\overline{\Delta\text{threshold}}$, then the method can proceed to operation 1220, which can include the wireless communication device 302 selecting and using an aggressive scan mode. Operation 1220 can accordingly correspond to an embodiment of operation 1050. If, on the other hand, it is determined in operation 1215 that $\overline{D}\leq\overline{\Delta\text{threshold}}$, then the method can instead proceed to operation 1225, which can include the wireless communication device 302 selecting and using a passive scan mode. Operation 1225 can accordingly correspond to an embodiment of operation 1060.

Returning to operation 1205, if it is determined that location-coverage mapping information is not available, then operations 1210-225 can be omitted, and the method can proceed to operation 1230 illustrated in FIG. 12B. Operation 1230 can include the wireless communication device 302 selecting to use a statistical mode and setting a scalar displacement threshold, $d_{threshold}$. The scalar displacement threshold can, for example, be set based on a rate of degradation of a received signal quality prior to the OOS condition. In this regard, operation 1230 can correspond to an embodiment of operation 920. Operation 1235 can include the wireless communication device 302 determining a displacement magnitude, D, indicative of a distance traveled by the wireless communication device 302 during the OOS condition. The displacement magnitude can, for example, be determined from satellite navigation system positioning data, location data, accelerometer data, some combination thereof, or the like, as described above. Operation 1235 can further include the wireless communication device 302 determining whether D is greater than $d_{threshold}$. Operation 1235 can accordingly correspond to an embodiment of operations 930 and 940. In an instance in which it is determined at operation 1235 that $D>d_{threshold}$, the method can proceed to operation 1240, which can include the wireless communication device 302 selecting and using an aggressive scan mode. Operation 1240 can accordingly correspond to an embodiment of operation 950. If, on the other hand, it is determined in operation 1235 that $D\leq d_{threshold}$, the method can instead proceed to operation 1245, which can include the wireless communication device 302 selecting and using a passive scan mode. Operation 1245 can accordingly correspond to an embodiment of operation 960.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for selecting an out of service (OOS) scan mode for a wireless communication device, the method comprising:
  by the wireless communication device:
  detecting occurrence of an OOS condition;
  setting a displacement threshold in response to the OOS condition;
  determining a first displacement magnitude indicative of a distance traveled by the wireless communication device at a first time during the OOS condition;
  determining whether the first displacement magnitude exceeds the displacement threshold;
  using a first scan mode to scan for network coverage in an instance in which it is determined that the first displacement magnitude exceeds the displacement threshold; and
  in an instance in which it is determined that the first displacement magnitude does not exceed the displacement threshold:
    using a second scan mode to scan for network coverage;
    determining a second displacement magnitude indicative of the distance traveled by the wireless communication device at a second time during the OOS condition, the second time being a defined time subsequent to the first time;
    determining whether the second displacement magnitude exceeds the displacement threshold;
    switching to the first scan mode to scan for network coverage in an instance in which the second displacement magnitude exceeds the displacement threshold; and
    continuing to use the second scan mode to scan for network coverage in an instance in which the second displacement magnitude does not exceed the displacement threshold,
  wherein the first scan mode has a greater scan frequency than the second scan mode.

2. The method of claim 1, further comprising the wireless communication device:
  determining a rate of degradation of a received signal quality prior to the OOS condition; and
  wherein setting the displacement threshold comprises setting the displacement threshold based at least in part on the rate of degradation of the received signal quality prior to the OOS condition.

3. The method of claim 2, further comprising the wireless communication device:
  determining whether the rate of degradation of the received signal quality prior to the OOS condition exceeds a threshold rate; and
  wherein setting the displacement threshold comprises:
    setting a first displacement threshold in an instance in which the rate of degradation of the received signal quality prior to the OOS condition exceeds the threshold rate; and
    setting a second displacement threshold in an instance in which the rate of degradation of the received signal quality prior to the OOS condition does not exceed the threshold rate, wherein first displacement threshold has a smaller magnitude than the second displacement threshold.

4. The method of claim 1, further comprising the wireless communication device:
  receiving, prior to the OOS condition, location-coverage mapping information indicative of an extent of network coverage within an area in which the wireless communication device is located; and
  wherein setting the displacement threshold comprises setting the displacement threshold based at least in part on the location-coverage mapping information.

5. The method of claim 4, further comprising the wireless communication device:
  determining a first displacement direction associated with the first displacement magnitude; and
  defining a first displacement vector based at least in part on the first displacement magnitude and the first displacement direction; and wherein:
  setting the displacement threshold comprises setting a threshold displacement vector based at least in part on the location-coverage mapping information and the first displacement direction; and
  determining whether the first displacement magnitude exceeds the displacement threshold comprises determining whether the first displacement vector exceeds the threshold displacement vector.

6. The method of claim 1, further comprising the wireless communication device:
  determining, in response to the OOS condition, whether the wireless communication device has access to location-coverage mapping information for an area in which the wireless communication device is located;
  in an instance in which it is determined that the wireless communication device has access to location-coverage mapping information for the area in which the wireless communication device is located, setting the displacement threshold comprises setting the displacement threshold based at least in part on the location-coverage mapping information; and in an instance in which it is determined that the wireless communication device does not have access to location-coverage mapping information for the area in which the wireless communication device is located, setting the displacement threshold comprises setting the displacement threshold based at least in part on a rate of degradation of a received signal quality prior to the OOS condition.

7. The method of claim 1, further comprising the wireless communication device:

detecting an input via a user interface of the wireless communication device after occurrence of the OOS condition; and using the first scan mode in response to the input.

8. The method of claim 1, wherein determining the first displacement magnitude comprises determining the first displacement magnitude based at least in part on position information determined via a satellite navigation system.

9. The method of claim 1, wherein determining the first displacement magnitude comprises determining the first displacement magnitude based at least in part on an accelerometer measurement.

10. A wireless communication device comprising:

a transceiver configured to transmit data to and receive data from a network; and processing circuitry coupled to the transceiver, the processing circuitry configured to control the wireless communication device to at least:

detect occurrence of an out of service (OOS) condition;

set a displacement threshold in response to the OOS condition;

determine a first displacement magnitude indicative of a distance traveled by the wireless communication device at a first time during the OOS condition;

determine whether the first displacement magnitude exceeds the displacement threshold;

use a first scan mode to scan for network coverage in an instance in which it is determined that the first displacement magnitude exceeds the displacement threshold; and in an instance in which it is determined that the first displacement magnitude does not exceed the displacement threshold:

use a second scan mode to scan for network coverage;

determine a second displacement magnitude indicative of the distance traveled by the wireless communication device at a second time during the OOS condition, the second time being a defined time subsequent to the first time;

determine whether the second displacement magnitude exceeds the displacement threshold;

switch to the first scan mode to scan for network coverage in an instance in which the second displacement magnitude exceeds the displacement threshold; and continue to use the second scan mode to scan for network coverage in an instance in which the second displacement magnitude does not exceed the displacement threshold, wherein, the first scan mode has a greater scan frequency than the second scan mode.

11. The wireless communication device of claim 10, wherein the processing circuitry is further configured to control the wireless communication device to:

determine a rate of degradation of a received signal quality prior to the OOS condition;

set the displacement threshold based at least in part on the rate of degradation of the received signal quality prior to the OOS condition.

12. The wireless communication device of claim 11, wherein the processing circuitry is further configured to control the wireless communication device to:

determine whether the rate of degradation of the received signal quality prior to the OOS condition exceeds a threshold rate; and set the displacement threshold at least in part by:

setting a first displacement threshold in an instance in which the rate of degradation of the received signal quality prior to the OOS condition exceeds the threshold rate; and setting a second displacement threshold in an instance in which the rate of degradation of the received signal quality prior to the OOS condition does not exceed the threshold rate, wherein first displacement threshold has a smaller magnitude than the second displacement threshold.

13. The wireless communication device of claim 10, wherein the processing circuitry is further configured to control the wireless communication device to:

receive, prior to the OOS condition, location-coverage mapping information indicative of an extent of network coverage within an area in which the wireless communication device is located; and set the displacement threshold based at least in part on the location-coverage mapping information.

14. The wireless communication device of claim 13, wherein the processing circuitry is further configured to control the wireless communication device to:

determine a first displacement direction associated with the first displacement magnitude;

define a first displacement vector based at least in part on the first displacement magnitude and the first displacement direction;

set the displacement threshold at least in part by setting a threshold displacement vector based at least in part on the location-coverage mapping information and the first displacement direction; and determine whether the first displacement magnitude exceeds the displacement threshold at least in part by determining whether the first displacement vector exceeds the threshold displacement vector.

15. The wireless communication device of claim 10, wherein the processing circuitry is further configured to control the wireless communication device to:

determine, in response to the OOS condition, whether the wireless communication device has access to location-coverage mapping information for an area in which the wireless communication device is located;

in an instance in which it is determined that the wireless communication device has access to location-coverage mapping information for the area in which the wireless communication device is located, set the displacement threshold based at least in part on the location-coverage mapping information; and in an instance in which it is determined that the wireless communication device does not have access to location-coverage mapping information for the area in which the wireless communication device is located, set the displacement threshold based at least in part on a rate of degradation of a received signal quality prior to the OOS condition.

16. The wireless communication device of claim 10, wherein the processing circuitry is further configured to control the wireless communication device to:
- detect an input via a user interface of the wireless communication device after occurrence of the OOS condition; and
- use the first scan mode in response to the input.

17. A non-transitory computer readable storage medium storing instructions that, when executed by one or more processors of a wireless communication device, cause the wireless communication device to:
- detect occurrence of an out of service (OOS) condition;
- set a displacement threshold in response to the OOS condition;
- determine a first displacement magnitude indicative of a distance traveled by the wireless communication device at a first time during the OOS condition;
- determine whether the first displacement magnitude exceeds the displacement threshold;
- use a first scan mode to scan for network coverage in an instance in which it is determined that the first displacement magnitude exceeds the displacement threshold; and
- in an instance in which it is determined that the first displacement magnitude does not exceed the displacement threshold:
  - use a second scan mode to scan for network coverage;
  - determine a second displacement magnitude indicative of the distance traveled by the wireless communication device at a second time during the OOS condition, the second time being a defined time subsequent to the first time;
  - determine whether the second displacement magnitude exceeds the displacement threshold;
  - switch to the first scan mode to scan for network coverage in an instance in which the second displacement magnitude exceeds the displacement threshold; and
  - continue to use the second scan mode to scan for network coverage in an instance in which the second displacement magnitude does not exceed the displacement threshold,
- wherein the first scan mode has a greater scan frequency than the second scan mode.

18. The non-transitory computer readable storage medium of claim 17, wherein execution of the instructions further causes the wireless communication device to:
- determine a rate of degradation of a received signal quality prior to the OOS condition,
- wherein the wireless communication device sets the displacement threshold based at least in part on the rate of degradation of the received signal quality prior to the OOS condition.

19. The non-transitory computer readable storage medium of claim 17, wherein execution of the instructions further causes the wireless communication device to:
- receive, prior to the OOS condition, location-coverage mapping information indicative of an extent of network coverage within an area in which the wireless communication device is located,
- wherein the wireless communication device sets the displacement threshold based at least in part on the location-coverage mapping information.

20. The non-transitory computer readable storage medium of claim 17, wherein execution of the instructions further causes the wireless communication device to:
- detect an input via a user interface of the wireless communication device after occurrence of the OOS condition; and
- use the first scan mode in response to the input.

* * * * *